(12) United States Patent
Kwong et al.

(10) Patent No.: US 11,483,368 B1
(45) Date of Patent: Oct. 25, 2022

(54) VIDEO STREAMING METHOD AND SYSTEM

(71) Applicant: City University of Hong Kong, Kowloon (HK)

(72) Inventors: Sam Tak Wu Kwong, Kowloon (HK); Xuekai Wei, Kowloon (HK); Mingliang Zhou, Chongqing (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/367,833

(22) Filed: Jul. 6, 2021

(51) Int. Cl.
| | |
|---|---|
| *G06F 13/00* | (2006.01) |
| *H04L 65/80* | (2022.01) |
| *G06F 3/01* | (2006.01) |
| *H04N 21/81* | (2011.01) |
| *H04N 21/462* | (2011.01) |
| *H04L 65/65* | (2022.01) |

(52) U.S. Cl.
CPC .............. *H04L 65/80* (2013.01); *G06F 3/012* (2013.01); *G06F 3/013* (2013.01); *H04L 65/65* (2022.05); *H04N 21/4621* (2013.01); *H04N 21/816* (2013.01)

(58) Field of Classification Search
CPC ....... H04L 65/80; H04L 65/608; H04L 65/65; G06F 3/012; G06F 3/013; H04N 21/4621; H04N 21/816
USPC .................. 709/231, 217–219, 232; 715/781
See application file for complete search history.

(56) References Cited

U.S. PATENT DOCUMENTS

| | | | |
|---|---|---|---|
| 10,062,414 B1 | 8/2018 | Westphal | |
| 10,158,685 B1 | 12/2018 | Hobby et al. | |
| 10,469,568 B2 * | 11/2019 | Jenkins | ................... H04L 67/42 |
| 10,554,953 B2 | 2/2020 | Raphael | |
| 10,754,511 B2 * | 8/2020 | Birkbeck | ............... G11B 27/34 |
| 11,010,632 B2 * | 5/2021 | Han | ...................... H04N 13/344 |
| 11,108,841 B2 * | 8/2021 | Han | ....................... H04L 65/80 |
| 11,330,239 B2 * | 5/2022 | Shi | ......................... G06T 3/0012 |
| 2015/0143239 A1 * | 5/2015 | Birkbeck | ............... G11B 27/10 |
| | | | 715/716 |
| 2015/0373153 A1 * | 12/2015 | Jenkins | ................... H04L 67/10 |
| | | | 709/203 |
| 2017/0295222 A1 * | 10/2017 | Jenkins | ................... H04L 67/10 |

(Continued)

FOREIGN PATENT DOCUMENTS

| | | |
|---|---|---|
| EP | 3346709 | 11/2018 |
| KR | 102089457 | 3/2020 |

(Continued)

OTHER PUBLICATIONS

H. Yuan, S. Zhao, J. Hou, X. Wei, and S. Kwong, "Spatial and temporal consistency-aware dynamic adaptive streaming for 360-degree videos," IEEE Journal of Selected Topics in Signal Processing, vol. 14, No. 1, pp. 177-193, 2020.

(Continued)

*Primary Examiner* — Kenneth R Coulter
(74) *Attorney, Agent, or Firm* — Renner Kenner Greive Bobak Taylor & Weber

(57) ABSTRACT

A method for streaming a video. The method includes determining a total bitrate for a segment of a video to be received and streamed; predicting a viewpoint of a user for the segment; and determining bitrates for one or more tiles in the segment based on the determined total bitrate and the predicted viewpoint.

51 Claims, 22 Drawing Sheets

(56) References Cited

U.S. PATENT DOCUMENTS

| | | | |
|---|---|---|---|
| 2018/0241988 A1* | 8/2018 | Zhou | H04L 65/80 |
| 2019/0191147 A1* | 6/2019 | Raphael | H04N 21/2387 |
| 2019/0230142 A1 | 7/2019 | He et al. | |
| 2019/0387039 A1 | 12/2019 | Han et al. | |
| 2020/0279127 A1 | 9/2020 | Han et al. | |
| 2020/0413022 A1* | 12/2020 | Shi | G06T 3/0012 |
| 2021/0042964 A1* | 2/2021 | Yeung | G06T 9/40 |
| 2022/0239896 A1* | 7/2022 | Xu | H04N 21/21805 |

FOREIGN PATENT DOCUMENTS

| | | |
|---|---|---|
| WO | 2017140948 | 8/2017 |
| WO | 2017214291 | 12/2017 |

OTHER PUBLICATIONS

M. Xu, C. Li, S. Zhang, and P. L. Callet, "State-of-the-art in 360-degree video/image processing: Perception, assessment and compression," IEEE Journal of Selected Topics in Signal Processing, vol. 14, No. 1, pp. 5-26, 2020.

A. Elgabli, K. Liu, and V. Aggarwal, "Optimized preference-aware multi-path video streaming with scalable video coding," IEEE Transactions on Mobile Computing, vol. 19, No. 1, pp. 159-172, 2020.

J. Li, S. Chu, F. Shu, J. Wu, and D. N. K. Jayakody, "Contract-based small-cell caching for data disseminations in ultra-dense cellular networks," IEEE Transactions on Mobile Computing, vol. 18, No. 5, pp. 1042-1053, 2019.

J. Lee, D. Yang, Y. Chen, and W. Liao, "Efficient multi-view 3d video multicast with depth-image-based rendering in lte-advanced networks with carrier aggregation," IEEE Transactions on Mobile Computing, vol. 17, No. 1, pp. 85-98, 2018.

\* cited by examiner

Algorithm 1 Proposed 360-degree streaming algorithm

Input: HM and EF traces, playback state $s_i$.
Output: Bitrate/quality level of each tile in the next segment.

1: Initialize. Discount factor for future reward, $\gamma$; RL policy, $\pi_\theta(s_i, a_i)$; bitrate for the first segment; etc.
2: for $i = 1$ to $N - 1$ do
3:    if Segment $i$ is fully downloaded then
4:       Generate HM overlap area using Eq. (12).
5:       Generate EF overlap area using Eq. (13).
6:       Compute the bitrate for tiles outside the generated HM overlap area.
7:    Select SU/SM prediction results in accordance with previous prediction errors.
8:    Generate the bitrate $R_c$ for segment $i + 1$.
9:    Perform bitrate allocation for every tile in segment $i + 1$ using Eq. (21).
10:   Download segment $i + 1$.
11:   end if
12: end for

Figure 7

| | Method | Average QoE | Average Bitrate (Mbps) | Viewing Quality (ePSNR) | Playback Freezing Length (s) | Viewing Quality Temporal Difference (dB) |
|---|---|---|---|---|---|---|
| QoE objective of (2,1,1) | FIX | 3840 | 6.51 | 37.32 | 1.76 | 2.37 |
| | LR | 4870 | 6.61 | 42.94 | 2.10 | 4.50 |
| | LRG | 4942 | 6.76 | 43.22 | 2.17 | 4.42 |
| | 360-P | 5801 | 7.69 | 44.84 | 2.71 | 4.32 |
| | EPASS | 5904 | 7.93 | 45.25 | 2.64 | 4.30 |
| | Proposed | 6695 | 8.47 | 46.09 | 2.58 | 4.17 |
| QoE objective of (1,2,1) | FIX | 1217 | 6.04 | 37.85 | 1.92 | 2.62 |
| | LR | 2172 | 6.93 | 42.92 | 2.20 | 4.65 |
| | LRG | 2248 | 7.03 | 43.24 | 2.29 | 4.45 |
| | 360-P | 2588 | 7.39 | 44.50 | 2.54 | 4.35 |
| | EPASS | 2647 | 7.57 | 44.75 | 2.52 | 4.25 |
| | Proposed | 3173 | 7.96 | 45.66 | 2.48 | 4.11 |
| QoE objective of (1,1,2) | FIX | 2449 | 6.58 | 37.43 | 1.71 | 2.46 |
| | LR | 3134 | 6.72 | 42.75 | 2.09 | 4.52 |
| | LRG | 3212 | 6.90 | 43.09 | 2.16 | 4.37 |
| | 360-P | 3773 | 7.51 | 44.58 | 2.46 | 4.30 |
| | EPASS | 3886 | 7.69 | 44.72 | 2.39 | 4.12 |
| | Proposed | 4361 | 8.01 | 45.57 | 2.43 | 4.04 |

Figure 13

| Method | Average QoE | Average Bitrate (Mbps) | Viewing Quality (ePSNR) | Playback Freezing Length (s) | Viewing Quality Temporal Difference (dB) |
|---|---|---|---|---|---|
| FIX | 3362 | 5.98 | 36.96 | 1.14 | 1.03 |
| LR | 3871 | 6.32 | 39.47 | 1.67 | 2.39 |
| LR-G | 3905 | 6.42 | 39.79 | 1.69 | 2.43 |
| 360-P | 4942 | 6.89 | 42.04 | 1.83 | 2.22 |
| EPASS | 5063 | 7.21 | 43.81 | 1.97 | 2.32 |
| Proposed | 5222 | 7.39 | 45.35 | 1.95 | 2.14 |

Figure 14

| Method | Average QoE | Average Bitrate (Mbps) | Viewing Quality (ePSNR) | Playback Freezing Length (s) | Viewing Quality Temporal Difference (dB) |
|---|---|---|---|---|---|
| FIX | 1031 | 3.36 | 33.54 | 1.54 | 2.25 |
| LR | 1334 | 3.79 | 34.75 | 2.26 | 3.47 |
| LR-G | 1382 | 3.87 | 35.09 | 2.33 | 3.44 |
| 360-P | 1986 | 4.49 | 36.53 | 2.86 | 3.53 |
| EPASS | 2197 | 4.71 | 37.21 | 2.74 | 3.51 |
| Proposed | 2581 | 5.02 | 38.29 | 2.63 | 3.36 |

Figure 15

| Method | Average QoE | Average Bitrate (Mbps) | Viewing Quality (ePSNR) | Playback Freezing Length (s) | Viewing Quality Temporal Difference (dB) |
|---|---|---|---|---|---|
| FIX | 1670 | 4.76 | 36.08 | 1.73 | 3.02 |
| LR | 2456 | 5.86 | 40.01 | 2.59 | 4.16 |
| LR-C | 2482 | 5.81 | 39.93 | 2.74 | 4.17 |
| 360-P | 3115 | 7.07 | 42.62 | 3.77 | 4.10 |
| EPASS | 3211 | 7.19 | 44.26 | 3.53 | 4.03 |
| Proposed | 3418 | 7.39 | 45.20 | 3.29 | 3.99 |

Figure 16

| Method | Average QoE | Average Bitrate (Mbps) | Viewing Quality (ePSNR) | Playback Freezing Length (s) | Viewing Quality Temporal Difference (dB) |
|---|---|---|---|---|---|
| FIX | 1204 | 4.01 | 34.67 | 1.69 | 3.59 |
| LR | 1410 | 4.32 | 35.61 | 2.21 | 4.83 |
| LR-G | 1480 | 4.46 | 35.87 | 2.33 | 4.86 |
| 360-P | 1967 | 4.91 | 37.51 | 3.03 | 4.92 |
| EPASS | 2017 | 5.16 | 38.10 | 2.67 | 4.80 |
| Proposed | 2557 | 5.52 | 39.87 | 2.59 | 4.54 |

Figure 17

VIDEO STREAMING METHOD AND SYSTEM

TECHNICAL FIELD

The invention relates to systems and methods for streaming video. More particularly, although not exclusively, the invention relates to systems and methods for streaming 360-degree video over mobile devices.

BACKGROUND

The widespread popularity of mobile devices, such as smartphones and wearable devices, and the rich variety of Internet applications available have greatly improved Internet experiences of users. Mobile devices account for a significant amount of Internet traffic. One recent application of mobile devices is immersive, interactive, and/or autonomous 360-degree video streaming over mobile devices. With the rapid advancement in computer vision and human-computer interaction, increasing the user's quality of experience (QoE) in 360-degree video streaming, e.g., using a head-mounted display (HMD), has become a hot topic in the field of multimedia experiences over mobile devices. Generally, to provide high-quality immersive experiences in 360-degree video streaming for users streaming 360-degree video over mobile devices, high resolutions and bitrates are needed for the 360-degree streaming. However, transmitting the content of an entire 360-degree video over a mobile network requires high bandwidth and, as the users will see only a small spatial area of the 360-degree video at a time, would lead to wasted bandwidth.

SUMMARY

In a first aspect, there is provided a method for streaming a video, comprising: (a) determining a total bitrate for a segment of a video to be received; (b) predicting a viewpoint of a user (viewer) for the segment; and (c) determining bitrates for one or more tiles in the segment based on the determined total bitrate and the predicted viewpoint. Steps (a) and (b) may be performed in any order (including at least partly simultaneously). As used herein, a segment of a video may include or be formed by one or more frames (temporal slices) of the video; a tile of a segment of a video may refer to a part of the segment (spatial slices).

Optionally, step (a) and/or step (b) is performed after all tiles in a previous segment of the video have been received. The previous segment and the segment are preferably consecutive segments of the video.

Optionally, step (a) comprises determining the total bitrate based on adaptive optimization of a quality of experience function.

Optionally, the adaptive optimization of the quality of experience function is based on a deep reinforcement learning model. The deep reinforcement learning model may include a deep deterministic policy gradient algorithm or model.

Optionally, step (a) is performed by the deep deterministic policy gradient algorithm processing the playback states of the user (e.g., associated with the previous segment(s) of the video) to determine a total bitrate (e.g., mapped from quality factor) of the segment with the objective to optimize or maximize the quality of experience function.

Optionally, the playback states include one or more or all of: past K bitrate records, corresponding download time, predetermined tile bitrate set for the segment, current buffer length, and current freezing length. K is a number larger than 1. The playback states may include additional parameters.

Optionally, the quality of experience function includes one or more or all of the following: a factor associated with visual quality of viewed tiles in the previous segment, a factor associated with average quality variation between two segments, a playback freezing event (e.g., length) factor, and a future freezing risk factor.

Optionally, one or more or all of the factors of the quality of experience function (including one or more or all of the above mentioned factors) is weighted by a respective weighting factor. The respective weighting factors may be adjustable. For example, the weighting factor may be adjustable based on a user input (user preference, selection, etc.) and/or a content of the segment or the video.

Optionally, the method further comprising receiving the playback states of the user (e.g., associated with the previous segment(s) of the video).

Optionally, step (b) includes predicting a single-user viewpoint trace for the segment based on a received viewpoint trace of the user (e.g., associated with the previous segment(s) of the video).

Optionally, step (b) further includes predicting a cross-user viewpoint trace for the segment.

Optionally, the method further comprises receiving the viewpoint trace of the user (e.g., associated with the previous segment(s) of the video). The viewpoint trace of the user may comprise, at least, a head movement trace and an eye fixation trace.

Optionally, step (b) includes generating a viewpoint prediction map of the user for the segment.

Optionally, step (b) includes predicting head movement area (e.g., map) of the user for the segment and predicting eye fixation area (e.g., map) of the user for the segment.

Optionally, the prediction of the single-user viewpoint trace for the segment is performed by a recurrent neural network model (e.g., a long short term memory model) processing the received viewpoint trace of the user. The prediction of the head movement area (e.g., map) of the user for the segment and the eye fixation area (e.g., map) of the user for the segment may be performed using the same recurrent neural network model (e.g., a long short term memory model) or different recurrent neural network models (e.g., long short term memory models).

Optionally, the prediction of the cross-user viewpoint trace for the segment is performed based on a saliency map (SM) of known cross-user viewpoint traces associated with the segment.

Optionally, the predicted single-user viewpoint trace for the segment and the predicted cross-user viewpoint trace for the segment are both applied to predict the viewpoint of the user for the segment.

Optionally, the predicted single-user viewpoint trace for the segment is weighted with a weighting factor and the predicted cross-user viewpoint trace for the segment is weighted with a weighting factor. The two weighting factors may be the same or different. Optionally, one or both of the weighting factors may be adjustable.

The segment of the video may include, at least, a first portion and a second portion. In this case, optionally, the method includes: assigning a higher weighting to the predicted single-user viewpoint trace for the first portion of the segment and assigning a lower weighting to the predicted cross-user viewpoint trace for the first portion of the segment, and/or assigning a lower weighting to the predicted single-user viewpoint trace for the first portion of the segment and assigning a higher weighting to the predicted cross-user viewpoint trace for the first portion of the segment.

Optionally, step (c) comprises determining bitrates for all tiles in the segment.

Optionally, determining bitrates for all tiles in the segment comprises allocating bitrate to each of the tiles such that a sum of the bitrates of all tiles in the segment in substantially equal to the total bitrate.

Optionally, the determining comprises: allocating a lower bitrate to the tiles in area outside a predicted head movement area for the segment; and allocating a higher bitrate to the tiles in area inside a predicted head movement area for the segment.

Optionally, allocating a lower bitrate to the tiles in area outside a predicted head movement area for the segment comprises: allocating minimum bitrate to the tiles in area outside a predicted head movement area for the segment.

Optionally, allocating a higher bitrate to area inside a predicted head movement area for the segment, comprises: allocating a lower bitrate to the tiles in area outside the predicted eye fixation area for the segment; and allocating a higher bitrate to the tiles in area inside the predicted eye fixation area for the segment.

Optionally, the determining comprises: controlling bitrates between adjacent tiles of the segment to be within a difference threshold.

Optionally, the method further comprises: transmitting a request to receive the tiles of the segment in accordance with the determined bitrates for the tiles.

Optionally, the request includes an order indicator to receive the tiles of the segment with the largest determined bitrate first.

Optionally, the request includes an order indicator to receive the tiles of the segment in the order of decreasing bitrates.

Optionally, the method further comprises: receiving the tiles of the segment in accordance with the determined bitrates for the tiles.

Optionally, the method further comprises: receiving the tiles of the segment in the order of decreasing bitrates.

Optionally, the method further comprises: presenting (and/or streaming) the received segment to a user. This may include, e.g., displaying the received segment to the user.

Optionally, the method includes repeating steps (a) to (c) for two or more segments of the video so as to stream at least part of the video.

Optionally, the method includes repeating steps (a) to (c) for all segments of the video so as to stream the entire video.

Optionally, the method for streaming the video is performed with an electrical device, e.g., a mobile device, operably connected with a streaming server via a communication network. The communication network may include one or more communication links, which may be wired or wireless. The electrical device may include one or more (a combination) of: smartphones, wearable computing devices, desktop computer, mobile computer device, head mounted display/device (e.g., with motion tracking device), VR headset, set-top-box, digital signage/kiosk/projector, etc. The electrical device may include a client, e.g., a video player for playing and/or streaming a video. The streaming server may be a DASH over HTTP server. The streaming server may hold, relay, and/or store tile-based 360-degree video sequence.

Optionally, the streaming is live streaming of a video.

Optionally, the video is an immersive video. The video may be Generally-spherical video, spherical video, or part spherical video. In a preferred example, the video is a 360-degree video.

In a second aspect, there is provided a system with respective means for implementing the method of the first aspect. The respective means may serve one or more function in the method of the first aspects.

In a third aspect, there is provided a system streaming a video, comprising one or more controllers arranged to: (a) determine a total bitrate for a segment of a video to be received; (b) predict a viewpoint of a user for the segment; and (c) determine bitrates for one or more tiles in the segment based on the determined total bitrate and the predicted viewpoint. The one or more controllers may be arranged to perform (a) and (b) in any order (including at least partly simultaneously). As used herein, a segment of a video may include or be formed by one or more frames (temporal slices) of the video; a tile of a segment of a video may refer to a part of the segment (spatial slices). The one or more controllers may be arranged in the same device or arranged distributive across two or more operably-connected devices.

Optionally, the one or more controllers are arranged to perform (a) and/or (b) after all tiles in a previous segment of the video have been received. The previous segment and the segment are preferably consecutive segments of the video.

Optionally, the one or more controllers are arranged to determine the total bitrate based on adaptive optimization of a quality of experience function.

Optionally, the one or more controllers are arranged to adaptively optimize the quality of experience function based on a deep reinforcement learning model.

Optionally, the deep reinforcement learning model comprises a deep deterministic policy gradient algorithm.

Optionally, the one or more controllers are arranged to use the deep deterministic policy gradient algorithm to process the playback states of the user (e.g., associated with the previous segment(s) of the video) to determine a total bitrate (e.g., mapped from quality) of the segment with the objective so as to optimize or maximize the quality of experience function.

Optionally, the playback states include one or more or all of: past K bitrate records, corresponding download time, predetermined tile bitrate set for the segment, current buffer length, and current freezing length, wherein K is a number larger than 0. The playback states may include additional parameters.

Optionally, the quality of experience function includes one or more or all of the following factors: factor associated with visual quality of viewed tiles in the previous segment; factor associated with average quality variation between two segments; playback freezing event factor; and future freezing risk factor.

Optionally, one or more or all of the factors of the quality of experience function (including one or more or all of the above mentioned factors) is weighted by a respective weighting factor. The respective weighting factors may be adjustable. For example, the weighting factor may be adjustable based on a user input (user preference, selection, etc.) and/or a content of the segment or the video. The user input may be received at a input device operably connected with the one or more controllers.

Optionally, the one or more controllers are arranged to receive the playback states of the user (associated with the previous segment).

Optionally, the one or more controllers are arranged to predict a single-user viewpoint trace for the segment based on a received viewpoint trace of the user (associated with the previous segment(s) of the video) to perform (b).

Optionally, the one or more controllers are further arranged to a cross-user viewpoint trace for the segment to perform (b).

Optionally, the one or more controllers are arranged to receive viewpoint trace of the user (associated with the previous segment(s))

Optionally, the viewpoint trace of the user comprises a head movement trace and an eye fixation trace.

Optionally, the one or more controllers are further arranged to generate a viewpoint prediction map of the user for the segment.

Optionally, the one or more controllers are further arranged to predict head movement area (e.g., map) of the user for the segment and predict eye fixation area (e.g., map) of the user for the segment.

Optionally, the one or more controllers are arranged to predict the single-user viewpoint trace for the segment by using a recurrent neural network model (e.g., a long short term memory model) to process the received viewpoint trace of the user. In one example, the one or more controllers are arranged to predict head movement area (e.g., map) of the user for the segment using one recurrent neural network model (e.g., a long short term memory model) and to predict eye fixation area (e.g., map) of the user for the segment using another recurrent neural network model (e.g., another long short term memory model). In another example, the one or more controllers are arranged to predict head movement area (e.g., map) of the user for the segment and eye fixation area (e.g., map) of the user for the segment using the same recurrent neural network model (e.g., long short term memory model).

Optionally, the one or more controllers are arranged to predict the cross-user viewpoint trace for the segment is performed based on a saliency map (SM) of known cross-user viewpoint traces associated with the segment.

Optionally, the one or more controllers are arranged to apply both the predicted single-user viewpoint trace for the segment and the predicted cross-user viewpoint trace for the segment to predict the viewpoint of the user for the segment.

Optionally, the predicted single-user viewpoint trace for the segment is weighted with a weighting factor and the predicted cross-user viewpoint trace for the segment is weighted with a weighting factor. Optionally, one or both of the weighting factors may be adjustable.

The segment of the video may include, at least, a first portion and a second portion. In this case, optionally, the one or more controllers are arranged to perform (b) such that the first portion of the segment includes a higher weighting to the predicted single-user viewpoint trace and a lower weighting to the predicted cross-user viewpoint trace, and/or the second portion of the segment includes a lower weighting to the predicted single-user viewpoint trace and a higher weighting to the predicted cross-user viewpoint trace.

Optionally, the one or more controllers are arranged to determine bitrates for all tiles in the segment.

Optionally, the one or more controllers are arranged to allocate bitrate to each of the tiles such that a sum of the bitrates of all tiles in the segment in substantially equal to the total bitrate.

Optionally, the one or more controllers are arranged to: allocate a lower bitrate to the tiles in area outside a predicted head movement area for the segment; and allocate a higher bitrate to the tiles in area inside a predicted head movement area for the segment.

Optionally, the one or more controllers are arranged to: allocating minimum bitrate to the tiles in area outside a predicted head movement area for the segment.

Optionally, the one or more controllers are arranged to: allocating a lower bitrate to the tiles in area outside the predicted eye fixation area for the segment; and allocating a higher bitrate to the tiles in area inside the predicted eye fixation area for the segment.

Optionally, the one or more controllers are arranged to control the bitrates between adjacent tiles of the segment to be within a difference threshold.

Optionally, the one or more controllers are arranged to generate, for transmission, a request to receive the tiles of the segment in accordance with the determined bitrates for the tiles. The request may include an order indicator to receive the tiles of the segment with the largest determined bitrate first. The request may include an order indicator to receive the tiles of the segment in the order of decreasing bitrates.

Optionally, the one or more controllers are arranged to receive the tiles of the segment in accordance with the determined bitrates for the tiles. The one or more controllers may be arranged to receive the tiles of the segment in the order of decreasing bitrates.

Optionally, the system further comprises a display operably connected with the one or more controllers for presenting the received segment to the user.

Optionally, the one or more controllers are arranged to repeat (a) to (c) for two or more segments of the video so as to stream at least part of the video.

Optionally, the one or more controllers are arranged to repeat (a) to (c) for all segments of the video so as to stream the entire video.

Optionally, the one or more controllers is arranged in an electrical device (e.g., mobile device) operably connected with a streaming server via a communication network.

The communication network may include one or more communication links, which may be wired or wireless. The electrical device may include one or more (a combination) of: smartphones, wearable computing devices, desktop computer, mobile computer device, head mounted display/device (e.g., with motion tracking device), VR headset, digital signage/kiosk/projector, etc. The electrical device may include a client, e.g., a video player for playing and/or streaming a video. The streaming server may be a DASH over HTTP server. The streaming server may hold, relay, and/or store tile-based 360-degree video sequence.

Optionally, the one or more controllers is arranged in a streaming server operably connected with an electrical device (e.g., a mobile device, for streaming the video) via a communication network.

Optionally, the one or more controllers is arranged partly in the electrical device and partly in the streaming server.

Optionally, the streaming is live streaming of a video.

Optionally, the video is an immersive video. The video may be a generally-spherical video, a spherical video, or a part spherical video. In a preferred example, the video is a 360-degree video.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 7 is a schematic diagram of a video streaming method in one embodiment of the invention;

FIG. 13 is a table showing comparison of quality of experience (QoE) metrics in terms of different QoE objectives for different viewpoint prediction methods (including the method in one embodiment of the invention and existing methods);

FIG. 14 is a table showing comparison of quality of experience (QoE) metrics in terms of mobile network case 1 for different viewpoint prediction methods (including the method in one embodiment of the invention and existing methods);

FIG. 15 is a table showing comparison of quality of experience (QoE) metrics in terms of mobile network case 2 for different viewpoint prediction methods (including the method in one embodiment of the invention and existing methods);

FIG. 16 is a table showing comparison of quality of experience (QoE) metrics in terms of mobile network case 3 for different viewpoint prediction methods (including the method in one embodiment of the invention and existing methods);

FIG. 17 is a table showing comparison of quality of experience (QoE) metrics in terms of mobile network case 4 for different viewpoint prediction methods (including the method in one embodiment of the invention and existing methods);

DETAILED DESCRIPTION

Figure 1:
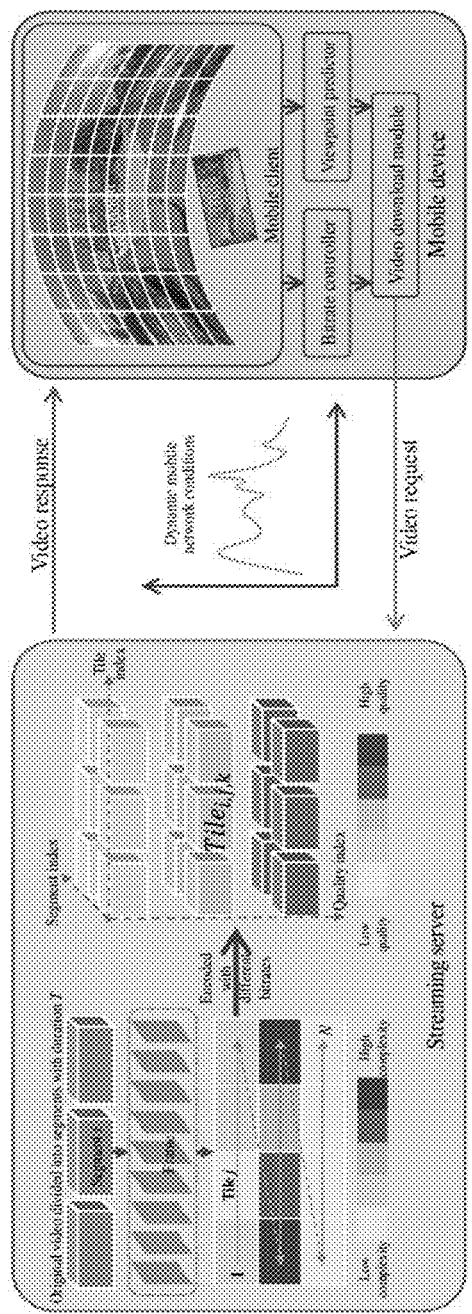
FIG. 1 is a schematic diagram of a tile-based 360-degree streaming system over mobile devices.

The inventors of the present invention have devised, through research, experiments, and trials, that tile-based coding schemes or layer-based coding schemes can both be used in viewpoint-based streaming strategies to allocate different bitrates to the contents of different video regions. Compared with layer-based coding scheme, tile-based coding schemes are usually easier to use and less complex. FIG. 1 shows a tile-based 360-degree streaming system over mobile devices. The system implements a tile-based coding scheme for 360-degree video coding, where i denotes the ith segment in the video sequence and ranges from 1 to S, with S representing the total number of video segments. The tiles are indexed from 1 to N ($j \in [1, N]$), where N represents the total number of tiles in one frame and j represents the jth tile in the frame. The video quality/bitrate level ranges from 1 to L ($k \in [1, L]$), where k represents the kth quality/bitrate level of the encoded video. In accordance with this scheme, denote the j-th tile in the i-th segment with quality level k by $Tile_{i,j,k}$. The inventors of the present invention have devised, through research, experiments, and trials, that tile-based adaptive bitrate (ABR) methods can be used to guarantee the user QoE while decreasing the total bandwidth cost; and both deterministic and probabilistic models can be used for 360-degree video streaming scenarios.

The inventors of the present invention have determined, through research, experiments, and trials, that tile-based ABR control can be regarded as a Markov decision process (MDP), which can be addressed through reinforcement learning (RL). In RL methods, appropriate actions, such as ABR control and viewpoint prediction, are adaptively taken to maximize a given QoE reward. In addition, bitrate allocation for each tile can benefit from game theory techniques, which assist in taking full advantage of the limited network bandwidth and in improving the user's QoE.

The inventors of the present invention have realized that existing ABR algorithm designs have achieved some QoE gains but are still subjected to challenges and shortcomings. First, the main characteristic of a mobile network is high variability in both link conditions and traffic characteristics. This inherent complexity of mobile networks has been overlooked in the design of existing ABR algorithms, making them not particularly suitable for 360-degree video streaming systems over mobile devices. Second, suitable metrics for QoE over mobile devices have not been fully considered in existing RL-based ABR methods. In practice, the video quality and its fluctuations directly affect the user QoE; however, the video bitrate cannot directly affect the video quality in Dynamic Adaptive Streaming over HTTP (DASH) QoE modelling. Playback freezing is another factor that has not been considered in the design of existing ABR algorithms. Finally, in addition to the application of ABR algorithms, 360-degree video streaming systems require interaction between the server and the clients since the user's current viewpoint information must be considered. Therefore, for regional quality control, it is necessary to consider a user's future viewpoint, meaning that 360-degree video streaming systems require viewpoint prediction capabilities. The inventors of the present invention have realized that viewpoint prediction relies on historical trace data or video content analysis, cross-user viewpoint prediction could further improve the prediction accuracy by allowing the viewpoint trajectories of multiple viewers to be correlated. Viewing behavior is correlated with the video content, and such correlation may help to predict future viewpoints. However, most existing studies have not focused on combining historical traces with video content information, thus preventing tile-level bitrate allocation from reaching the global optimum.

Against this background, the inventors of the present invention have devised, in one embodiment, a joint RL and game theory method for segment-level continuous bitrate selection and tile-level bitrate allocation for 360-degree streaming. In this embodiment, the tile-based 360-degree video sequences are stored on the DASH server. The head mount device (HMD) the playback state and the user's viewpoint traces to the controller, which then estimates the total requested quality/bitrate level for the upcoming segment and allocates the corresponding bitrate for every tile in this segment.

The inventors of the present invention have devised, through research, experiments, and trials, that streaming systems generally consist of streaming data, codecs, and players. Given the smoothness requirement for successive segments, fluctuating mobile network conditions, playback freezing avoidance, and other relevant factors, adaptive bitrate streaming (ABS) techniques have become a new technological trend for providing smooth and high-quality streaming. Some existing ABS systems can provide consumers with relatively high-quality videos while using less manpower and fewer resources, and thus have become predominant systems among video delivery systems. When an ABS system is working properly, end users can enjoy high-quality video playback without notable interruption. Among the various ABS strategies, DASH is often used because of its convenience and ease of system construction. In an ABS system, the original videos are divided into "segments" of a fixed playback length, each of which is encoded into multiple representations with different resolutions, bitrates, and qualities; then, ABS clients request segments with the appropriate representations in accordance with the playback state and the expected network conditions. First, because the DASH system is built on top of HTTP, the video packets encounter no difficulties passing through firewalls or network address translation (NAT) devices. Second, the DASH ABR decisions are mainly client driven; thus, all of the ABR logic resides on the client side, and playback does not require a persistent connection between the server and the client. Furthermore, the server is not required to maintain session state information for each client, thereby increasing scalability. Also, because the DASH system transmits its video data over HTTP, it can be easily and seamlessly deployed on and adapted to all existing HTTP facilities, including HTTP caches, servers, and scalable content delivery networks (CDNs). At present, demand for high-definition (HD) videos and ultra-high-definition (UHD) videos is continuing to increase. To enhance the performance of 360-degree streaming systems, the concepts of tiles and slices are used in High Efficiency Video Coding (HEVC) to split video frames; consequently, tile-based strategies, as shown in FIG. 1, are feasible and popular in 360-degree streaming systems because of their low complexity. Therefore, an object of this embodiment is to improve performance of tile-based 360-degree streaming systems.

Figure 2:
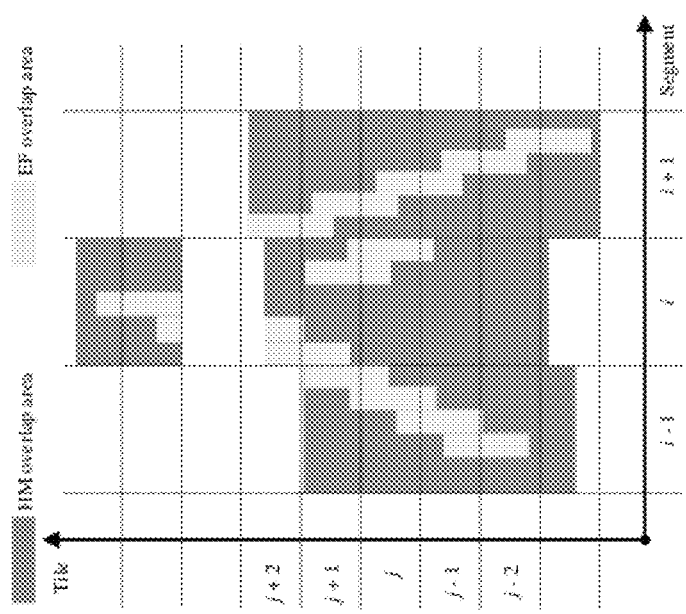
FIG. 2 is a graph showing overlapping areas of predicted head movement (HM) area and predicted eye fixation (EF) area.

The inventors of the present invention have devised, through research, experiments, and trials, that various bitrate allocation strategies have been developed for 360-degree streaming systems to improve streaming performance. For example, C L Fan et al, "*Fixation prediction for* 360° *video streaming in head-mounted virtual reality,*" *in Proceedings of the 27th Workshop on Network and Operating Systems Support for Digital Audio and Video,* 2017 has disclosed allocating more bitrate to the tiles inside the viewpoint area, which can be predicted with the help of the previous viewpoint or frame features. The streaming system disclosed in F. Qian et al "*Flare: Practical viewport-adaptive* 360-*degree video streaming for mobile devices,*" *in Proceedings of the 24th Annual International Conference on Mobile Computing and Networking,* 2018, is designed to combine adaptive QoE optimization models with new transmission protocols for efficient streaming. The streaming system 'EPASS' disclosed in Y. Zhang, et al "*Epass*360*: QoE-Aware* 360-*degree video streaming over mobile devices,*" *IEEE Transactions on Mobile Computing,* pp. 1-1, 2020 concentrates on the common scenarios in real-world 360-degree video streaming services in which users may specify various preferences for QoE metrics. In tile-based 360-degree video streaming schemes, the viewpoint prediction method is critical for lowering the bandwidth cost of unnecessary tiles. Any prediction error may lead to wasted bandwidth and reduced user QoE. The process of viewpoint prediction can be divided into two parts: head movement (HM) area prediction and eye fixation (EF) area prediction. HM area prediction determines the view region to be seen in one frame, and EF area prediction indicates the region of highest interest to humans within the view region. Accordingly, the HM areas should be predicted first to identify which tiles will be viewed by users. Then, given the predicted HM overlap area, the predicted EF area within the view region can be further estimated to help determine the bitrates of the tiles. For illustration, the HM and EF overlap areas in one segment are shown in FIG. 2. A linear regression (LR) analysis method with a Gaussian prediction error may be used to improve the prediction performance beyond that of the basic LR method. Alternatively, a viewpoint prediction method utilizing previous monotonically increasing or decreasing viewpoint trace samples. Predicting the viewpoint becomes more complicated as the length of a video segment increases, which prevents the predicted viewpoint traces from being directly applied in the ABR algorithm. For accurate viewpoint prediction, methods based on both SU viewpoint traces and cross-user viewpoint models can be used.

Figure 3:
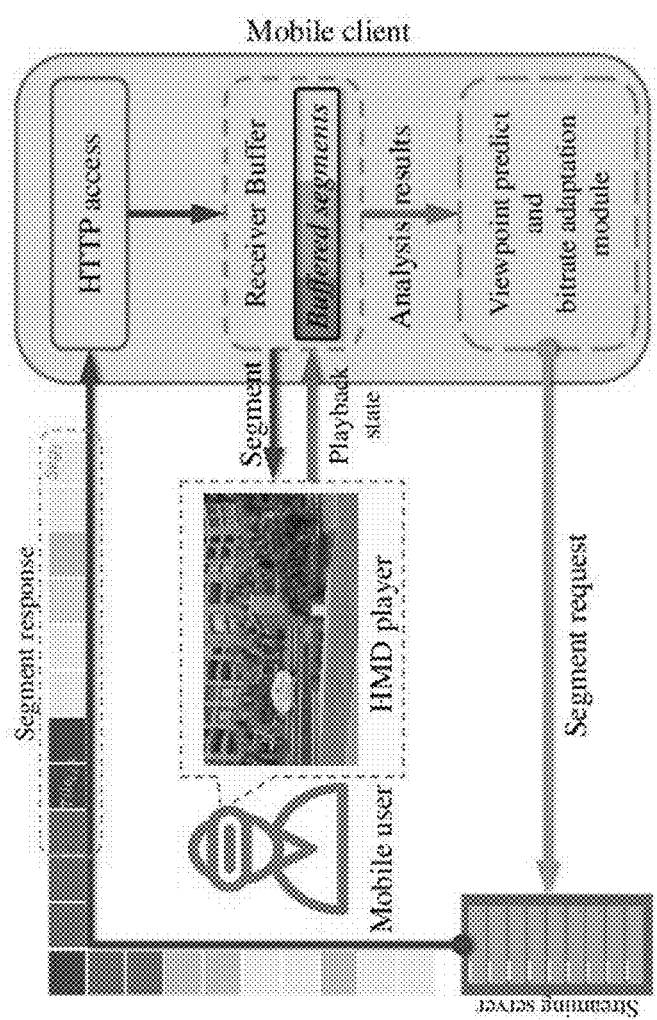
FIG. 3 is a schematic diagram of a video streaming system in one embodiment of the invention.
Figure 4:
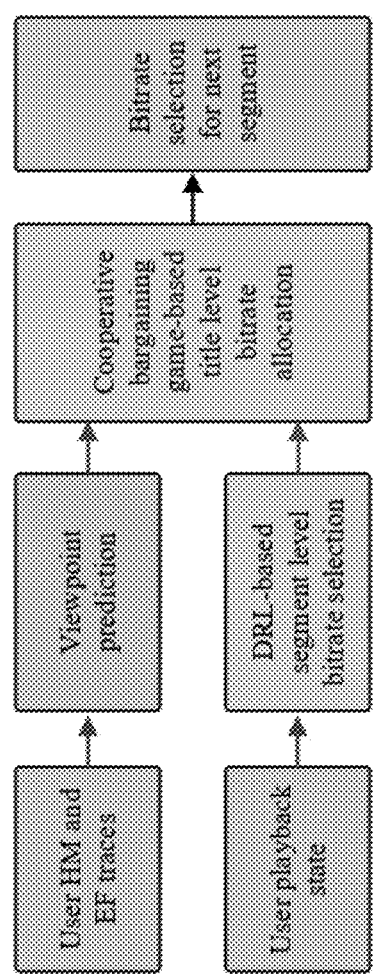
FIG. 4 is a video streaming method in one embodiment of the invention.

FIG. 3 shows a tile-based 360-degree streaming system in one embodiment of the invention whereas FIG. 4 shows the overall framework of the transmission strategy of a video streaming method in one embodiment of the invention. An efficient 360-degree streaming system should adapt to fluctuating mobile bandwidth conditions and allocate high bitrates to the tiles in the view region. Given these considerations, the transmission strategy in this embodiment is applied following the DASH structure to adaptively optimize the a QoE objective, and this strategy consists of a viewpoint prediction part and a bitrate allocation part. The viewpoint prediction process in the method of this embodiment is further divided into two parts: HM area prediction and EF area prediction. The tiles in the EF area are allocated the highest bitrates, the other tiles in the HM area are allocated a lower bitrate, and the tiles outside the HM area are transmitted with the lowest bitrate to reduce the bandwidth consumption.

The 360-degree videos used for testing in this embodiment are encoded in the commonly used equirectangular projection format, and the 360-degree streaming performance is evaluated under dynamic viewpoint changes and bandwidth fluctuations. Accurate bitrate allocation for every tile in a segment enables high-quality video playback and avoids playback freezing. Meanwhile, as the long short-term dependency greatly influences the prediction task, an LSTM network is applied in this embodiment to model the RL-based segment-level bitrate selection process. The LSTM model is particularly effective for online time-series prediction over multiple sources and tasks.

In the tile-level bitrate allocation method of this embodiment, to address the case in which the user may occasionally exhibit an orientation inconsistency with the predicted HM area as a result of prediction error, the tiles outside the HM area are first allocated a fixed minimum bitrate. Thus, there will always be video content within the user's view region to ensure a certain user QoE during playback. Then, the tiles inside the HM area are allocated different selected rates depending on the predicted EF area, where these bitrates are chosen in accordance with the interest level of the tiles in the predicted EF area with the help of game theory methods. Furthermore, once the bitrates of all tiles in one segment are determined, in the method of this embodiment, the tiles with the maximum bitrate are requested first to ensure a smooth and high-quality playback experience. The bitrate difference between adjacent tiles is constrained not to exceed a certain level to avoid distinct borders observable by the user. Following the above rules, a suitable bitrate is selected for every tile inside and outside the view area, as shown in FIG. 3. In the transmission strategy of this embodiment, a joint SU and multiuser viewpoint prediction method is defined for viewpoint prediction. Based on the various patterns of historical traces, an SU viewpoint prediction model may be biased. By contrast, viewpoint traces from different users will possess some similarities that can provide an opportunity to predict SU viewpoint traces by analysing multiuser data. To ensure full comprehension of the training dataset, a saliency map and a viewpoint transition probability model are jointly leveraged to further improve the viewpoint prediction accuracy.

Training a Reinforcement Learning (RL Model with a Freezing-Aware QoE Model

In one embodiment, a freezing-aware QoE model with the following features is formulated to evaluate the method of present embodiment. In the QoE model, $Seg_i$ denotes segment i, where i is the video segment index. $Tile_{i,j,k}$ is the tile representation of segment $Seg_i$, where j is the jth tile of video segment i and k is the quality/bitrate level index for video segment i. $rate(Tile_{i,j,k})$ is the corresponding video bitrate, and $u(Tile_{i,j,k})$ is the video quality measured in terms of the weighted-to-spherically-uniform peak signal-to-noise ratio (WS-PSNR). The ABR decision is made after all tiles in one segment have been fully downloaded to choose a suitable video representation $\{rate(Tile_{i,j,k}), u(Tile_{i,j,k})\}$ for the next segment from the available set. For each segment $Seg_i$, the download time $\tau_i$ is calculated as follows:

$$\tau_i = T \sum_{j=1}^{N} (rate(Tile_{i,j,k}))/C_i, \quad (1)$$

where $\Sigma_{j=1}^{N} (rate(Tile_{i,j,k}))$ is the total bitrate of the tiles in segment $Seg_i$, also called the segment-level bitrate, which is selected from $\{rate(Tile_{i,j,k})|k=1, 2, \ldots, L\}$; T is the playback duration of segment i; and $C_i$ is the average network capacity during the download of segment i.

Whereas $\Sigma_{j=1}^{N} (rate(Tile_{i,j,k}))$ is the total bitrate of the tiles in $Seg_i$, for every frame in $Seg_i$, only the HM area can be seen by the user. Therefore, $x_j \in [0,1]$ is introduced to represent whether $Tile_{i,j,k}$ is in the HM area, and the visual quality of the viewed tiles can be formulated as $$QLTY_i = \sum_{j=1}^{N} (x_j \times u(Tile_{i,j,k})), \quad (2)$$

where $x \in \{0,1\}$ represents whether the tile is inside the view area, with $x_j=1$ meaning that the tile $Tile_{i,j,k}$ is in the HM area; otherwise, $x_j=0$. Furthermore, the average quality variation between two segments can be calculated as $$VAR_i = \left| \sum_{j=1}^{N} (u(x_j Tile_{i+1,j,k})) - \sum_{j=1}^{N} (u(x_j Tile_{i,j,k})) \right| + inVAR, \quad (3)$$

where inVAR is the average intra-segment quality variation, i.e., the quality variation within the user's view. Let $B(Seg_i)$ be the buffer length when starting to download segment $Seg_i$. When $\tau_i$ is less than or equal to $B(Seg_i)$, the DASH user will have a smooth playback experience; when it is greater than $B(Seg_i)$, playback freezing will occur, influencing the user QoE. The playback freezing length $F_i$ is defined as $$F_i = \max\{0, \tau_i - B(Seg_i)\}. \quad (4)$$

A suitable buffer level can prevent playback freezing events in the case of a sudden drop in network throughput. When $\tau_i > B(Seg_i)$, the playback buffer becomes empty before the next segment is completely downloaded. When segment i+1 is fully downloaded, the buffer length for the next segment is T. When $T < \tau_i < B(Seg_i)$, the buffer length for the next segment decreases. When $\tau_i < T < B(Seg_i)$, the buffer length for the next segment increases.

Thus, the buffer length variation can be described as follows:

$$B(Seg_{i+1}) = \begin{cases} T, & \text{if } \tau_i \geq B(Seg_i), \\ B(Seg_i) - \tau_i + T, & \text{if } \tau_i < B(Seg_i). \end{cases} \quad (5)$$

Accordingly, in this embodiment, the QoE of the tile-based 360-degree DASH streaming system is formulated based on several factors: the visual quality of the viewed tiles in the received segment, the quality variations between two segments, the occurrence of playback freezing events, and the future freezing risk. To derive an RL policy that maximizes the user QoE, in this embodiment, the above-mentioned QoE factors are considered and e a QoE reward function for use in the RL-based ABR decision-making method are proposed. In this embodiment, the WS-PSNR is applied as the instantaneous quality metric for a video sequence.

In addition, the future freezing risk $FFR_i$ is introduced to avoid excessively short buffer lengths:

$$FFR_i = \max(0, B_{thresh} - B(Seg_i)), \quad (6)$$

where $B_{thresh}$ represents the risk of playback freezing. The value of $B_{thresh}$ is calculated as follows:

$$B_{thresh} = \begin{cases} 0.5 \times \tau_1, & i = 1, \\ \max(B_{thresh,i-1}, 0.5 \times \tau_i), & i > 1. \end{cases} \quad (7)$$

The DASH QoE function is defined in the form of a weighted sum:

$$QoE_i = \omega_u QLTY_i - \omega_{var} VAR_i - \omega_f F_i - \omega_{ff} FFR_i, \quad (8)$$

in which the weights $\omega_u$, $\omega_f$ and $\omega_{ff}$ are used to balance the different QoE metrics. Thus, they also represent the trade-off between high video quality, a constant quality level, and smooth playback. The desired operating point might depend on several factors, including user preferences and video content. For the parameter tuning strategy, the strategy disclosed in Y. Zhang et al "DRL360: 360-degree video streaming with deep reinforcement learning,", *IEEE INFOCOM 2019—IEEE Conference on Computer Communications*, April 2019, pp. 1252-1260 is applied. To provide a high user QoE, the bitrate/quality level, for all segments should be determined via the ABR scheme to maximize the total QoE objective:

$$\arg\max_{\{Tile_{i,j,k}\}} \sum_{i=1}^{S} QoE_i. \quad (9)$$

ABR Control with Viewpoint Prediction Maps

Viewpoint Prediction Method

Understanding the viewing behavior of a user/viewer is important for an ABR algorithm to make future decisions. A user's viewing behavior mainly depends on the current viewing traces and is also related to the video content. In this embodiment, a viewpoint prediction method based on SU viewpoint traces and a cross-user viewpoint model is applied to capture the spatial and temporal behavior of users in order to determine the HM and EF areas for every segment. The SU viewpoint traces are predicted utilizing an LSTM network to determine the HM and EF areas for the user. Because a user's viewing behavior mainly depends on the current viewing traces, an LSTM network can model the user's behavior and generate a precise prediction. The model parameters are denoted by $\theta$, and the LSTM model for predicting the EF trace in the time dimension is formulated as follows:

$$EF'_{i+1} = LSTM(EF_0, \ldots, EF_i; \theta_{EF}), \quad (10)$$

where $\theta_{EF}$ denotes the parameters used in predicting the EF area. The frequency at which consecutive images appear on the HMD display is expressed in terms of the number of frames per second (FPS or frame rate, denoted by $N_{FPS}$). The predicted EF area in one frame can be recurrently fed into the LSTM model to obtain $N_{FPS}$ EF areas to generate the predicted EF area for one segment.

Similarly, the future HM trace at the segment level can be predicted with an LSTM model, as follows:

$$HM'_{n+1} = LSTM(HM_0, \ldots, HM_n; \theta_{HM}), \quad (11)$$

where $\theta_{HM}$ denotes the parameters used in predicting the HM area. Because different users may have different viewing behaviors, such as watching videos without much HMD movement or moving the HMD frequently to explore the video content, in order to further decrease the prediction error, an SM prediction method is introduced to model cross-user viewpoint traces. If the predicted SU trace is driven by the video content, then the SM method, such as the one disclosed in M. Xu at al "*Predicting head movement in panoramic video: A deep reinforcement learning approach,*" *IEEE Transactions on Pattern Analysis and Machine Intelligence*, vol. 41, no. 11, pp. 2693-2708, November 2019, will yield more precise prediction results. Otherwise, the SU results will work better. In this embodiment, to benefit from the advantages of both the SU and SM methods, higher weights $\epsilon_1$ and $\epsilon_2$ are set for the SU prediction results in the first half of each segment. In the second half of each segment, higher weights $\epsilon_1$ and $\epsilon_2$ are assigned to the SM prediction results. The final HM area $FNHM'_{i+1}$ and EF area $FNEF'_{i+1}$ are predicted via the following equations:

$$FNHM'_{i+1} = \epsilon_1 SUHM1'_{i+1} + (1-\epsilon_1)SMHM1'_{i+1} + (1-\epsilon_2)SUHM2'_{i+1} + \epsilon_2 SMHM2'_{i+1}, \quad (12)$$

$$FNEF'_{i+1} = \epsilon_1 SUEF1'_{i+1} + (1-\epsilon_1)SMEF1'_{i+1} + (1-\epsilon_2)SUEF2'_{i+1} + \epsilon_2 SMEF2'_{i+1}, \quad (13)$$

where $\{SUHM1'_{i+1}, SUHM2'_{i+1}\}$, $\{SUEF1'_{i+1}, SUEF2'_{i+1}\}$, $\{SMHM1'_{i+1}, SMHM2'_{i+1}\}$, and $\{SMEF1'_{i+1}, SMEF2'_{i+1}\}$ represent the HM/EF areas predicted using the SU/SM methods in the first/second halves of each segment. For the HM area, the weights $\epsilon_1$ and $\epsilon_2$ are calculated via the following equations:

$$\epsilon_1 = \max\{PPSU1'_{i+1,HM}, PPSM1'_{i+1,HM}\}, \quad (14)$$

$$\epsilon_2 = \max\{PPSU2'_{i+1,HM}, PPSM2'_{i+1,HM}\}, \quad (15)$$

where $\{PPSU1'_{i+1,HM}, PPSM1'_{i+1,HM}\}$ are the prediction precisions in the first half of each segment using the SU and SM methods, respectively, and $\{PPSU2'_{i+1,HM}, PPSM2'_{i+1,HM}\}$ are the corresponding prediction precisions in the second half of each segment. For the EF area, the weights $\epsilon_1$ and $\epsilon_2$ are calculated via the following equations:

$$\epsilon_1 = \max\{PPSU1'_{i+1,EF}, PPSM1'_{i+1,EF}\}, \quad (16)$$

$$\epsilon_2 = \max\{PPSU2'_{i+1,EF}, PPSM2'_{i+1,EF}\}, \quad (17)$$

where $\{PPSU1'_{i+1,EF}, PPSM1'_{i+1,EF}\}$ are the prediction precisions in the first half of each segment using the SU and SM methods, respectively, and $\{PPSU2'_{i+1,EF}, PPSM2'_{i+1,EF}\}$ are the corresponding prediction precision in the second half of each segment.

Segment-Level RL-Based Bitrate Selection

Figure 5:
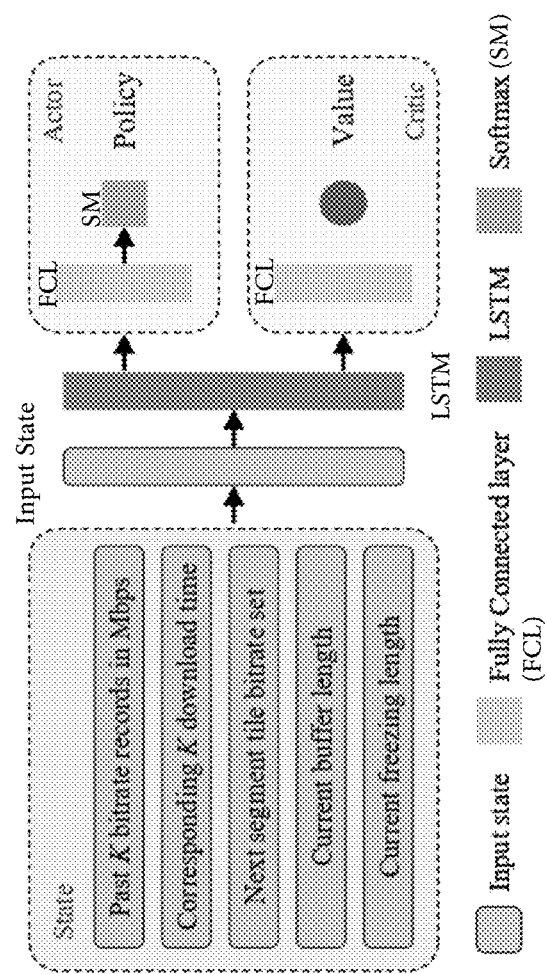
FIG. 5 is a schematic diagram of a reinforcement learning (RL) based continuous adaptive bitrate control scheme in one embodiment of the invention.

An algorithm for joint RL- and cooperative-bargaining-game-based bitrate selection is provided in this embodiment. In this embodiment, the deep deterministic policy gradient (DDPG) algorithm is used as the basis for the RL-based ABR decision algorithm for segment bitrate control. The DDPG framework for RL-based DASH ABR decision-making is illustrated in FIG. 5. In this embodiment, the state of the MDP in time step i is described by a 5-tuple $s_i = (\overrightarrow{rate_t}, \overleftarrow{\tau_t}, rate(Seg_i), B(Seg_i), F_i)$. The elements of the DASH ABR MDP are as follows:

Input State: After downloading each segment i, the DASH agent receives the playback state $s_i = (\overrightarrow{rate_t}, \overleftarrow{\tau_t}, rate(Seg_i), B(Seg_i), F_i)$ as its input.

Action Mapping: When segment i is completely downloaded (e.g., in time step i), the DASH learning agent generates an output action $a_i$ that determines the quality level $U_{i+1} = (rate_{i+1}, u(Tile_{i+1}))$ of the next segment to be downloaded, $a_i \in [bitrate_{min}, bitrate_{max}]$, corresponding to the available bitrate level for the video segment. Considering the bitrate limits and discrete quality levels, to make more precise ABR decisions, the action is mapped to the available bitrate level to improve the accuracy of each choice.

Reward: Given a state and an action, the DASH MDP reward function $r_i$ is defined as follows:

$$r_i(s_i, a_i) = QoE_i. \quad (18)$$

The goal of the agent is to maximize the expected return from each state $s_i$. The action value $Q^\pi(s, a)$ is the expected return when action a is selected in state s following policy $\pi$:

$$Q^\pi(s,a) = E[R_i | s_i = s, a]. \quad (19)$$

The optimization algorithm presented in R. Hong et al "*Continuous bitrate & latency control with deep reinforcement learning for live video streaming,*" in *Proceedings of the 27th ACM International Conference on Multimedia*, 2019 is used to learn the RL network parameters, with base learning rates of $10^{-3}$ and $10^{-4}$ for the actor and critic networks, respectively. The discount factor $\gamma$ used for training is 0.99. The Ornstein-Uhlenbeck process is utilized to ensure the exploratory behavior of the actor network.

Tile-Level Cooperative-Bargaining-Game-Based Bitrate Selection

Once the bitrate for the next segment has been selected, tile-level bitrate allocation is then performed in accordance with the view prediction results. An algorithm is constructed for this purpose as follows. A cooperative bargaining game represents a situation in which the players have similar motivations to cooperate but have different preferences and conflicts of interest over how to cooperate and thus is suitable for describing this task, in which the tiles in different positions in the same segment bargain over the available bitrate. The objective of such a bargaining game is to reach a beneficial agreement among the players. Consider a bargaining game with N players; if an agreement is reached, players 1, 2, ..., N will receive utilities $u_1, u_2, ..., u_N$, respectively. The utility vector $\vec{u} = (u_1, u_2, ..., u_N)^T$ is one entry in the set of all possible utility combinations, which is denoted by $U = (\vec{u}_1, \vec{u}_2, ..., \vec{u}_m)$, $m \in [0, \Omega]$, where $\Omega$ is the number of possible utility combinations. In addition, $d_j$ denotes the disagreement of player j, and the disagreement vector $d = (d_1, d_2, ..., d_N)^T$ is defined to ensure a minimum utility for each player. Each element in the Nash bargaining solution (NBS, a possible utility combination) must be larger than the disagreement of the corresponding player; otherwise, the bargaining game will fail.

If U is non-empty, convex, closed and bounded, then the cooperative bargaining game with N players can be denoted by h(U, d), and the NBS can be obtained by means of the following theorem.

Theorem 1: The NBS $\vec{u}_{opt} = (u_{1,opt}, u_{2,opt}, ..., u_{n,opt})^T$ is the unique bargaining solution for h(U, d) if the following equation is satisfied:

$$h(U,d) = \max_{u_m} \prod_{j=1}^{N}(u_{j,m} - d_j) \Rightarrow u_{opt} = \arg\max_{u_m} \prod_{j=1}^{N}(u_{j,m} - d_j), \quad (20)$$

where $\vec{u}_{opt} = (u_{1,opt}, u_{2,opt}, ..., u_{n,opt})^T$ and $u_{1,opt} \geq d_1$, $u_{2,opt} \geq d_2, ..., u_{n,opt} \geq d_N$.

In addition, there are several axioms concerning the NBS, as follows:

i) Individual rationality. $u_{j,opt} \geq d_j$ for all j.

ii) Feasibility $u_{opt} \in U$.

iii) Pareto optimality of $u_{opt}$.

iv) Independence of irrelevant alternatives. If $u_{opt} \in V \subset U$ is the NBS of h(V, d), then the NBS of h(U, d) is also $u_{opt}$.

v) Independence of linear transformations. Let $u_{opt}$ be the solution to h(U, d), and let g be a linear transformation function.

Suppose that $U_g = g(U)$ and $d_g = g(d)$; then, the solution to $h(U_g, d_g)$ is $g(u_{opt})$.

vi) Symmetry. If U is invariant under all exchanges of users, then all elements of $u_{opt}$ are equal, i.e., $u_{1,opt} = u_{2,opt} = ... = u_{n,opt}$.

Axioms (i)-(iii) guarantee the existence and efficiency of the NBS, while axioms (iv)-(vi) guarantee the fairness of the solution. The symmetry axiom guarantees equal priority of the players during the bargaining game when the players have the same utility function and disagreement. It should be noted that when the elements of the disagreement vector d are set to equal values, the NBS will be equal to an optimized solution that maximizes the average utility when the channel conditions for all users are the same. Based on bargaining game theory and the NBS, the optimal bandwidth allocation for multiple tiles in a 360-degree streaming system is modelled as a Nash bargaining game and thus can be solved by the NBS. In the tile-level bitrate allocation algorithm of this embodiment, the utility is the expected quality for the next segment, and the maximization problem is formulated as a bargaining game as follows:

$$\max_R \prod_{j=1}^{N}(u(Tile_{i,j,k}) - d_j) \quad (21)$$

$$\text{s.t.} \sum_{j=1}^{N}(rate(Tile_{i,j,k})) \le R_c,$$

$u(Tile_{i,j,k}) \ge d_j$, j=1, . . . , N, where the minimum acceptable utility for tile j is denoted by $d_j$, i.e., the minimum quality that can be accepted for the jth tile. The total bitrate in the HM overlap area as given by the RL agent is denoted by $R_c$. The maximization of a product can be transformed into the maximization of a sum in the logarithm domain, and the NBS $tile_{opt}$ can be obtained by introducing Lagrange multipliers. In this paper, the utility function for bitrate allocation is defined as follows:

$$u(Tile_{i,j,k}) = \frac{rate(Tile_{i,j,k}) - c_j}{\rho_j k_j m_j}, \quad (22)$$

where $C_j$ is the number of header bitrates, $\rho_j$ and $k_j$ are the utility parameters, and $m_j$ denotes the mean average deviation (MAD) of the average residuals between the original and reconstructed segments. These parameters are given by the server side before the start of transmission. $d_j$ is obtained via the following equation:

$$d_j = ISHM_j \times \frac{rate(Tile_{i,j,1}) - C_j}{\rho_j k_j m_j} + ISEF_j \times \frac{rate(Tile_{i,j,2}) - C_j}{\rho_j k_j m_j}, \quad (23)$$

where $rate(Tile_{i,j,1})$ is the bitrate of tile j in segment i with quality level 1 and $rate(Tile_{i,j,2})$ is the bitrate of tile j in segment i with quality level 2. The set $\{ISHM_j, ISEF_j\}$ represents whether tile j is located in the predicted EF area. If tile j is located in the predicted EF area, then $\{ISHM_j, ISEF_j\}=\{0,1\}$; otherwise, $\{ISHM_j, ISEF_j\}=\{1,0\}$. The utility set U is first proven to be a convex set, as follows.

The utility set U is a convex set: The utility set U is a convex set if and only if for any utility points $X=(X_1, \ldots, X_N)=(u_1(x), \ldots, u_N(x)) \in U$ and $Y=(Y_1, \ldots, Y_N)=(u_1(y), \ldots, u_N(y)) \in U$, the following condition is satisfied:

$$\theta X + (1-\theta)Y \in U, \quad (24)$$

where $0 \le \theta \le 1$ and $x=(x_1, x_2, \ldots, x_N)$ and $y=(y_1, y_2, \ldots, y_N)$ are bitrate allocation strategies that satisfy the total bitrate constraints. Based on the utility function, $$\sum_{j=1}^{N}((\theta X_j + (1-\theta)Y_j)\rho_j k_j m_j + C_j) = \quad (25)$$

$$\sum_{j=1}^{N}\theta(X_j \rho_j k_j m_j + C_j) + \sum_{j=1}^{N}(1-\theta)(Y_j \rho_j k_j m_j + C_j) =$$

$$\sum_{j=1}^{N}\theta x_j + \sum_{j=1}^{N}(1-\theta)y_j < R_c,$$

and $$(\theta X_j + (1-\theta)Y_j)\rho_j k_j m_j + C_j = \theta x_j + (1-\theta)y_j > R_j^0. \quad (26)$$

Therefore, $\theta X + (1-\theta)Y \in U$; thus, the feasible utility set U is convex.

Determination of the NBS: Because U is a convex set, Equation (21) can be converted into the following format:

$$\min_R -\sum_{j=1}^{N}\ln(u(Tile_{i,j,k}) - d_j) \quad (27)$$

$$\text{s.t.} \sum_{j=1}^{N}(rate(Tile_{i,j,k})) - R_c \le 0,$$

$d_j - u(Tile_{i,j,k}) \le 0$, j=1, . . . , N.

The optimal solution to Equation (27) can be obtained by solving the Karush-Kuhn-Tucker (KKT) conditions. Let $\lambda$ and $n_j$ (j=1, . . . ,N) be the Lagrange multipliers; then the following Lagrangian function $L(rate(Tile_{i,j,k}), \lambda, n_j)$ can be obtained:

$$L = -\sum_{j=1}^{N}\ln(u(Tile_{i,j,k}) - d_j) \quad (28)$$

$$+\lambda\left(\sum_{j=1}^{N}(rate(Tile_{i,j,k})) - R_c\right)$$

$$+\sum_{j=1}^{N}(\eta_j(d_j - u(Tile_{i,j,k}))).$$

The KKT conditions for Equation (28) can be written as $$\begin{cases} \sum_{j=1}^{N}rate(Tile_{i,j,k}) - R_c \le 0, & (i) \\ d_j - u(rate(Tile_{i,j,k})) \le 0, j=0, \ldots, N, & (ii) \\ \lambda \ge 0, & (iii) \\ \eta_j \ge 0, j=0, \ldots, N, & (iv) \\ \lambda\left(\sum_{j=1}^{N}(rate(Tile_{i,j,k})) - R_c\right) = 0, & (v) \\ \eta_j(d_j - u(Tile_{i,j,k})) = 0, j=1, \ldots, N, & (vi) \\ \nabla L(rate(Tile_{i,j,k}), \lambda, \eta_j) = 0. & (vii) \end{cases} \quad (29)$$

By substituting the utility function (22) into Equation (29(vii)), this condition can be rewritten as $$\frac{\partial L}{\partial rate(tile_{i,j,k})} = -\frac{\frac{\partial \ln(u_j - d_j)}{\partial rate(tile_{i,j,k})}}{u_j - d_j} + (\lambda - \eta_j) = 0. \quad (30)$$

According to Equation (29(vi)), there must be a solution rate j that is larger than $rate(d_j)$, such that $d_j - u(Tile_{i,j,k}) < 0$ and $n_j = 0$:

$$rate_j = \frac{1}{\lambda} + C_j + \rho_j k_j m_j d_j. \quad (31)$$

As shown in Equation (29(v)), $$\sum_{j=1}^{N}(rate(Tile_{i,j,k})) - R_c = 0. \quad (32)$$

Δ can be calculated as $$\lambda = \frac{N}{\left(R_c - \sum_{j=1}^{N}(C_j + \rho_j k_j m_j d_j)\right)}. \quad (33)$$

Therefore, the NBS, i.e., $te_{opt}=(\text{rate}(\text{Tile}_{i,1,k})_{opt}, \ldots, \text{rate}(\text{Tile}_{i,N,k})_{opt})^T$, can be obtained as $$rate_{j,opt} = \frac{\left(R_c - \sum_{j=1}^{N}(C_j + \rho_j k_j m_j d_j)\right)}{N} + C_j + \rho_j k_j m_j d_j, \quad (34)$$

where $rate_{opt}=\{rate_{j,opt}\}$, $j=1, \ldots, N$, is the NBS for Equation (21). Based on the NBS, in the method of this embodiment, the bitrate list for the current tile set is used as a look-up table to find an appropriate bitrate that is close to the NBS for every tile in the segment.

FIG. 7 shows a video streaming method in one embodiment of the invention. In the method, when a segment has been fully received, the HM and EF traces and the playback state $s_i$ are used as the input. The HM and EF overlap areas are first predicted via the method. In addition, the total bitrate for the next segment is generated via the RL model. Finally, the bitrate levels of the tiles in the next segment are determined by means of the cooperative bargaining game algorithm. The method of this embodiment relies on predicting both the HM and EF overlap areas in the next segment, and RL framework supports the determination of the total bitrate/quality level for the next segment through continuous control. Cooperative game theory is used to allocate the bitrate for each tile in the next segment.

Implementation

The method of the above embodiment is implemented on the mobile device client and the streaming server to achieve precise viewpoint prediction and bitrate allocation for the requested tiles. The mobile client receives the requested 360-degree video segments and the updated cross-user viewpoint prediction map generated via the SM method. By jointly considering the SM and SU viewpoint prediction results, the segment- and tile-level bitrates are allocated with the method. After bitrate allocation, the client sends the ordered tile requests and the recorded user viewpoint traces to the server to be used to update the cross-user viewpoint prediction map using the SM method.

Mobile device client and streaming server: In the evaluation of the performance of the method of the above embodiment, all experiments were performed on an Ubuntu (Version 16.04) system with a GTX 2080 Ti GPU, an i7-8700K CPU, and 32 GB of memory. The platform was modified to support the testing of all ABR algorithms requesting video segments from the DASH client side. In the experiment, the Google Chrome browser was used as the mobile device client, and an Apache web server (version 2.4.7) was modified with the software dash.js (version 3.0.0) to serve as a DASH server running on the same machine as the client. The DASH client was configured to have a maximum playback buffer capacity of 10 seconds.

Videos and viewpoint traces: For the experiments, 360-degree video contents were collected from a dataset that includes videos playing both fast and slow. The corresponding user viewpoint traces were also provided by this dataset, with a 200-ms granularity. Videos and their corresponding viewpoint traces were randomly selected to form the training set, and the remaining videos were used as the test set for evaluation. All videos were encoded by Kvazaar with HEVC under rate control mode and assigned bitrates of 0.8 Mbps, 1.2 Mbps, 2 Mbps, 3 Mbps, 4 Mbps, 8 Mbps, 12 Mbps, 20 Mbps and 36 Mbps (8192×4096). Thus, each video was encoded to generate nine bitrate representations, i.e., $N_R=9$. Then, the videos were divided into segments of one second, two seconds, and three seconds in length using MP4 box to investigate the influence of the segment length on 360-degree video streaming. In addition, for each segment, the frames were split into 6×6, 12×6, and 12×12 tile configurations to investigate the influence of the tile configuration on 360-degree video streaming. The viewpoint angle was set to be the commonly used viewpoint angle for mobile devices of 100×100 degrees.

Figure 6A:
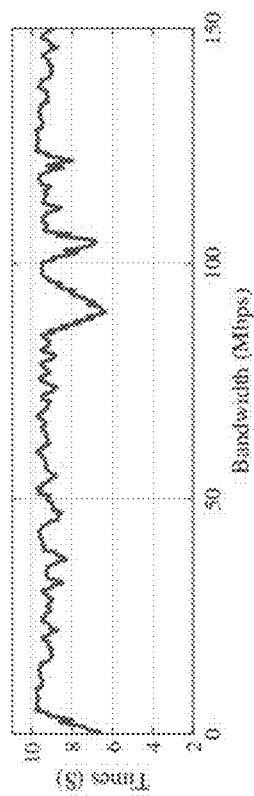
FIG. 6A is a graph showing a bandwidth profile used in evaluating the performance of the method in one embodiment.
Figure 6B:
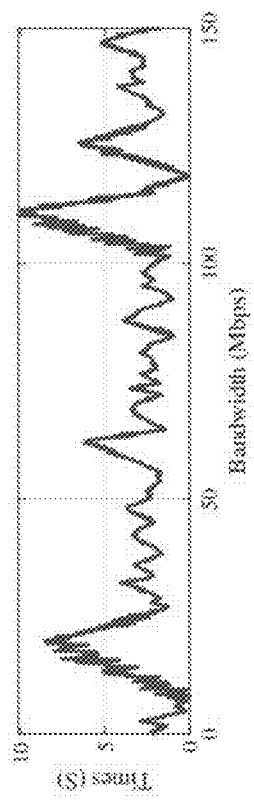
FIG. 6B is a graph showing a bandwidth profile used in evaluating the performance of the method in one embodiment.
Figure 6C:
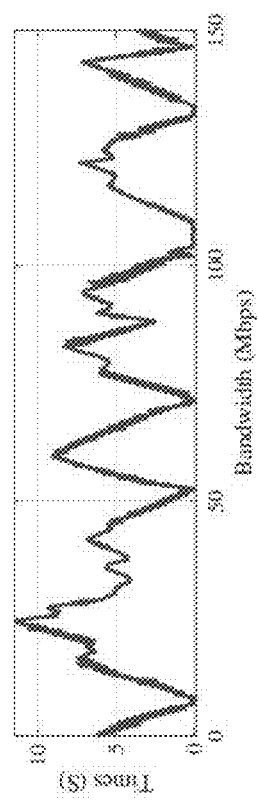
FIG. 6C is a graph showing a bandwidth profile used in evaluating the performance of the method in one embodiment.
Figure 6D:
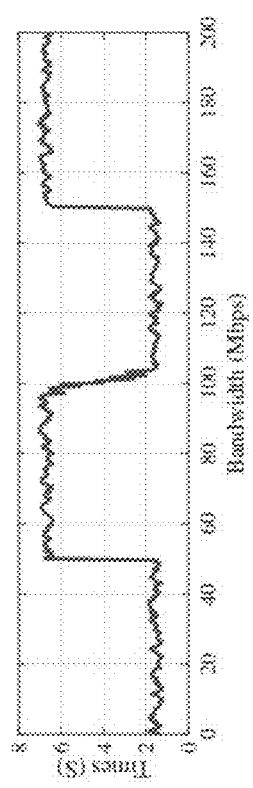
FIG. 6D is a graph showing a bandwidth profile used in evaluating the performance of the method in one embodiment.

Bandwidth profiles: The method of the above embodiment was evaluated using both real and synthetic bandwidth profile datasets. For the real bandwidth dataset, five hundred bandwidth profiles of at least 320 seconds in length under various network conditions were randomly selected and scaled up from the typical HSDPA bandwidth dataset and 5G dataset. Two hundred of the generated bandwidth profiles were randomly selected to train the RL-based ABR model, and the rest were used for testing. The values of the selected bandwidth profiles fell between 0.7 Mbps and 20 Mbps. For the synthetic bandwidth dataset, bandwidth profiles classified into four types were used for evaluation; the four types of profiles are depicted in FIGS. 6A to 6D. The bandwidth profile type shown in FIG. 6A represents a steady cellular network with high bandwidth and low network fluctuations. The type shown in FIG. 6B represents limited bandwidth conditions with a low bandwidth and high fluctuations. The other two types, shown in FIGS. 6C and 6D represent users moving in an urban environment with high bandwidth/fluctuations and a sudden bandwidth loss corresponding to high-to-low bandwidth and low fluctuations, respectively. The last profile type was mainly used to evaluate how large bandwidth changes affect the algorithms. The lightweight network simulation tool "Mahimahi" was used to emulate the bandwidth conditions from the network trace dataset, with a 40 ms round-trip time (RTT) between the DASH server and the client.

Algorithms for comparison: The following five existing tile-based 360-degree ABR control algorithms were chosen for comparison with the 360-degree streaming method in the above embodiment of the invention:

FIX: In the FIX method, bitrate allocation is performed dynamically for an entire segment without tile-based encoding, and the user's 360-degree HM behavior is ignored. This ABR method uses the harmonic mean for throughput prediction and then selects the highest available bitrate within the predicted throughput.

LE: Linear regression is leveraged to predict the viewpoint, and a probabilistic optimization model for the average viewpoint bitrate is set up to allocate the rates for tiles.

LJ-G: A Gaussian prediction error is used in a linear-regression-based viewpoint prediction model.

360-P: This framework is a 360-degree version of the "Pensieve" model disclosed in H. Mao et al *"Neural adaptive video streaming with pensieve," in Proceedings of the Conference of the ACM Special Interest Group on Data Communication*, 2017, which is also an RL-based model for DASH streaming of traditional video content leveraging the A3C model. The 360-P method involves a specific prediction model for the previous viewpoint trajectories to ensure suitability for the 360-degree video scenario.

EPASS: This method, disclosed in Zhang et al. "*Epass360: QoE-aware 360-degree video streaming over mobile devices,*" IEEE Transactions on Mobile Computing, pp. 1-1, 2020, involves LSTM-based SU viewpoint and bandwidth prediction models for bitrate allocation in a tile-based 360-degree video streaming system.

Performance Evaluation

The performance of the method of the above embodiment is evaluated relative to that of various existing methods for multiple 360-degree videos under a variety of real network traces. Both the prediction performance for the HM and EF overlap areas and the ABR performance are evaluated.

Viewpoint Prediction Performance

To quantify the viewpoint prediction performance during the playback of 360-degree video contents under different network conditions, the average prediction precision and prediction error of the SU, SM, and the above-proposed viewpoint prediction methods were evaluated. A prediction method with a low prediction precision or a high prediction error will cause low-quality areas to be rendered to the user. The average prediction precision is represented by the intersection over union (IoU), which can be obtained by dividing the overlap area by the union area between the predicted and ground-truth view areas with a view angle of 100°×100°. The performance of the viewpoint prediction methods was measured without considering bandwidth variations. The prediction error represents the situation in which necessary tiles for view rendering are assigned the lowest bitrate as a result of the uncertainty of the prediction method. Accordingly, the prediction error is defined as the percentage of lowest-bitrate tiles rendered in the user's view area in one segment.

Figure 8A:
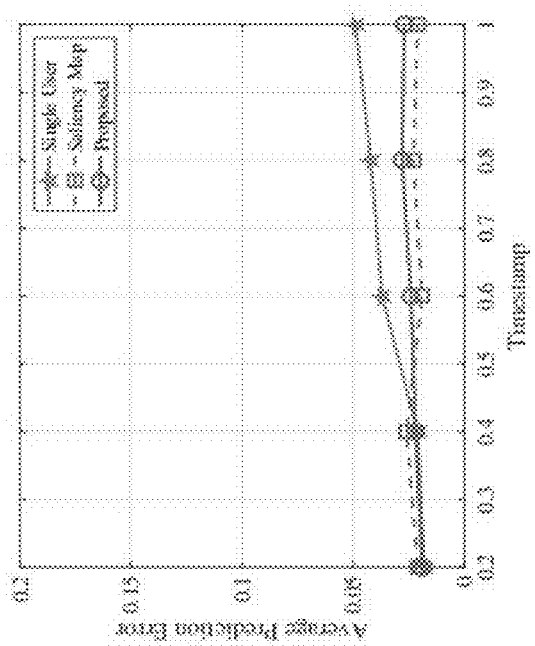
FIG. 8A is a graph showing average prediction precision performance of the method in one embodiment of the invention.
Figure 8B:
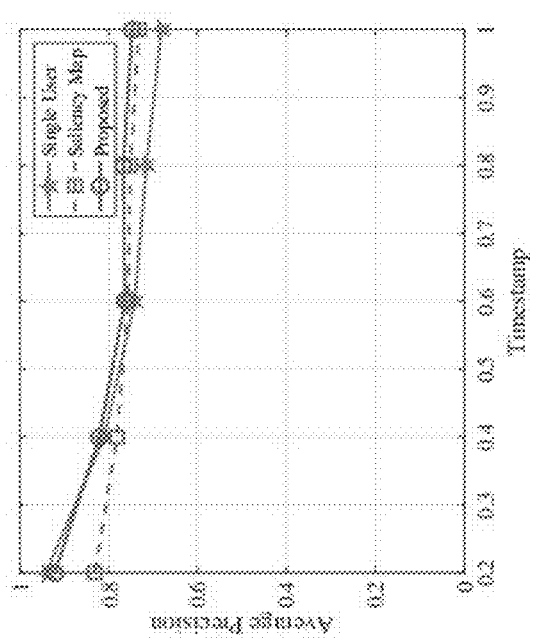
FIG. 8B is a graph showing average prediction error performance of the method in one embodiment of the invention.

The average prediction precision and the prediction error of all viewpoint prediction algorithms were measured at five timestamps in every segment. For every frame in the segment, the precision value was obtained after prediction, and the prediction error was calculated after processing the whole segment. The average prediction results at timestamps m=0, . . . , 1 of the SU, SM, and the proposed algorithms of the above embodiment are shown in FIGS. 8A and 8B. It can be seen from FIG. 8A that the SU prediction method performs better before m=0.4 and significantly degrades in performance over time. This is because the SU method relies only on the user's own previous viewpoint traces for future viewpoint prediction, leading to missing information. By considering multiuser viewing traces, the SM method can better comprehend the video content to provide more stable prediction performance throughout a segment. Also, by considering SU and multi-user information simultaneously, the proposed method in this embodiment outperforms the other two algorithms. It can also be seen from FIG. 8B that the proposed viewpoint prediction method tends to have a lower prediction error, as the proposed method assigns more weight to the SM prediction results for distant-future prediction. The prediction precision of the proposed viewpoint prediction scheme were also compared with that of existing solutions, including the prediction methods used in LR, LR-G, and EPASS. To ensure fair comparisons, the proposed algorithm was tested with the same segment length and tile configuration scheme (12×12).

Figure 9:
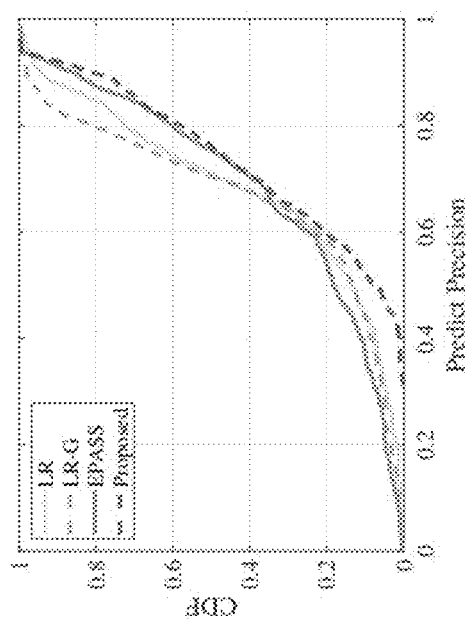
FIG. 9 is a graph showing the average prediction precision performance of different viewpoint prediction methods (including the method in one embodiment of the invention and existing methods)

FIG. 9 shows that the proposed viewpoint prediction algorithm outperforms the existing prediction method used in EPASS. The proposed algorithm can ensure precise prediction performance can be ensured for both near-future and distant-future prediction within the length of a segment by simultaneously considering the historical traces and the video contents for viewpoint prediction.

Effectiveness of Continuous Bitrate Control

Figure 10A:
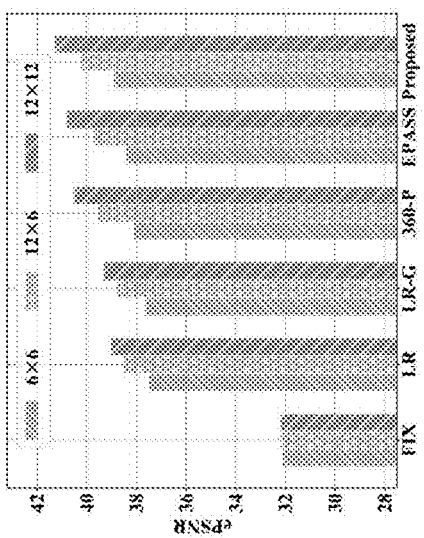
FIG. 10A is a graph showing average effective viewpoint weighted-to-spherically-uniform peak signal-to-noise ratio (ePSNR) of different viewpoint prediction methods (including the method in one embodiment of the invention and existing methods) under stable network conditions with different file configurations.
Figure 10B:
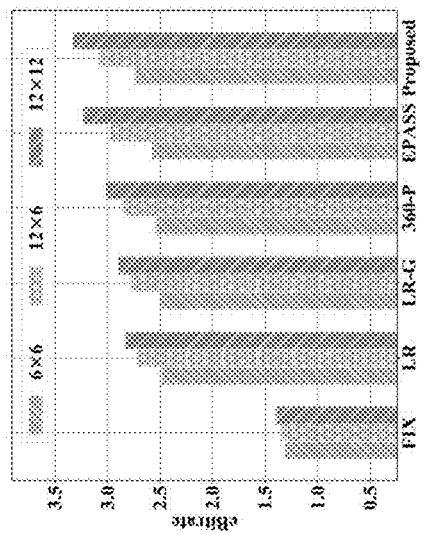
FIG. 10B is a graph showing average effective bitrate (eBitrate) of different viewpoint prediction methods (including the method in one embodiment of the invention and existing methods) under stable network conditions with different file configurations.
Figure 11B:
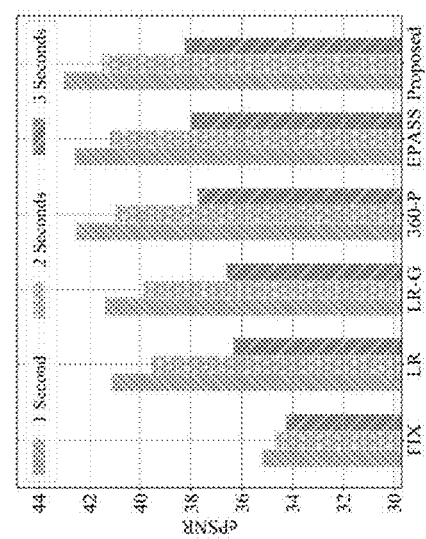
FIG. 11B is a graph showing average effective bitrate (eBitrate) of different viewpoint prediction methods (including the method in one embodiment of the invention and existing methods) under real network traces with different segment lengths.
Figure 11A:
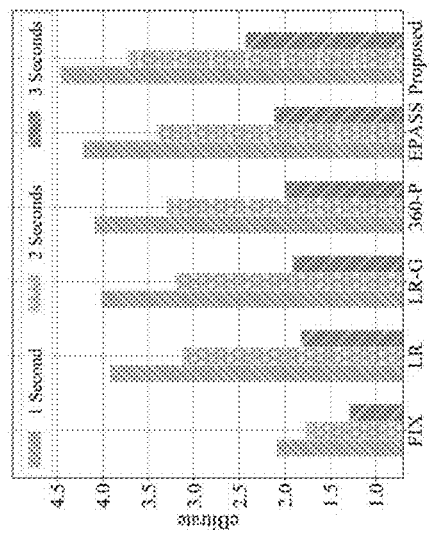
FIG. 11A is a graph showing average effective viewpoint weighted-to-spherically-uniform peak signal-to-noise ratio (ePSNR) of different viewpoint prediction methods (including the method in one embodiment of the invention and existing methods) under real network traces with different segment lengths.
Figure 12A:
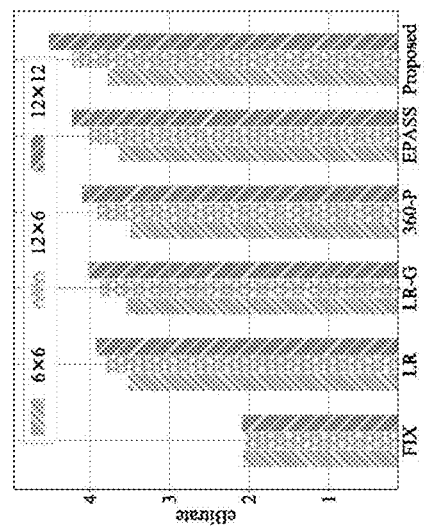
FIG. 12A is a graph showing average effective viewpoint weighted-to-spherically-uniform peak signal-to-noise ratio (ePSNR) of different viewpoint prediction methods (including the method in one embodiment of the invention and existing methods) under real network traces with different file configurations.
Figure 12B:
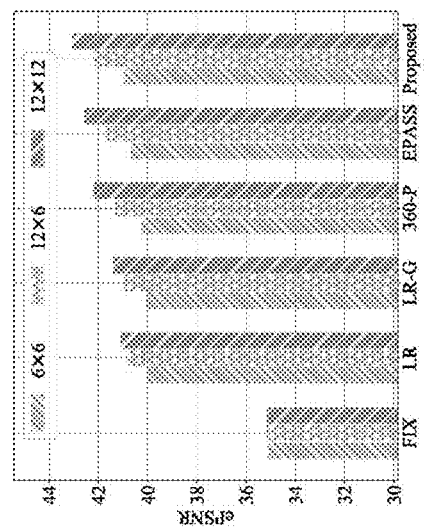
FIG. 12B is a graph showing average effective bitrate (eBitrate) of different viewpoint prediction methods (including the method in one embodiment of the invention and existing methods) under real network traces with different file configurations.

Once the viewpoint prediction results have been generated, the download bitrate for the tiles in the next segment should be determined and allocated. The segment-level bitrate is determined by the proposed RL-based ABR algorithm, and the tile-level bitrates are chosen based on the predicted HM and EF areas and the selected segment-level bitrate following the allocation strategy described above. Here, the effectiveness of continuous segment-level bitrate control and game-theory-based tile-level bitrate allocation is evaluated under real bandwidth profiles. The performance is evaluated in terms of the average effective viewpoint WS-PSNR (ePSNR) and the average effective bitrate (eBitrate) under various experimental conditions. The ePSNR is the average WS-PSNR of tiles used to render the view area, and the eBitrate represents the actual downloaded bitrates of the tiles for rendering. First, stable network conditions (6 Mbps) were used to test the influence of different viewpoint prediction methods and tile configuration schemes on 360-degree streaming ABR control, as shown in FIGS. 10A and 10B. From FIGS. 10A and 10B, it can be seen that the proposed prediction scheme outperforms the FIX, LR, LR-G, 360-P, and EPASS methods. The three different tile configuration schemes used to evaluate the different 360-degree ABR control methods in these experiments are 6×6, 12×6, and 12×12. The results indicate that the best performance can be achieved with the 12×12 tile configuration because more redundant areas can be allocated lower bitrates, while higher bitrates can be assigned to the refined EF area. The results also show that the rate of increase in the QoE gain will slow down as more complex tiling schemes lead to an additional burden in terms of the video encoding and decoding processes. The FIX method does not rely on viewpoint prediction and assumes that all viewpoints have the same probability, preventing it from benefiting from different tile configurations and causing it to incur high bandwidth waste. The performance for different segment durations (1 second, 2 seconds, and 3 seconds) is shown in FIGS. 11A and 11B. For all compared algorithms, the performance decreases with a longer segment length because of the lower prediction precision and higher prediction error. Considering the results shown in FIGS. 10A to 11B, video segments encoded with the 12×12 tile configuration and a one-second playback duration were chosen to evaluate the performance of the different ABR algorithms under various real bandwidth profiles. The experimental results shown in FIGS. 12A and 12B indicate that compared with the other methods, the proposed method can provide higher rendered video quality for users with lower bandwidth waste.

QoE Gain of the Proposed Method

To further compare and analyze each algorithm, the user QoE gains in terms of different QoE objectives were further evaluated based on the real bandwidth profile dataset. The detailed QoE gains in terms of different QoE objectives are shown in the table of FIG. 13. The evaluation results in this table show that the proposed ABR control scheme, including the segment-level bitrate decision method and the tile-level bitrate allocation method, together with the proposed viewpoint prediction method, can outperform the other existing algorithms, achieving higher QoE gains in terms of various QoE objectives. In particular, the proposed method can guarantee a significant quality improvement in the case of maximizing the video quality $QLTY_i$ in the QoE objective (2,1,1,1). Furthermore, the number of changes in video quality or the playback freezing length decreases when more weight is assigned to $VAR_i$ or $F_i$, respectively. Different ABR control strategies are needed for different QoE objectives. It can be seen from the results that it is difficult for the predefined ABR control strategies used in the FIX, LR, and LR-G algorithms to optimize for different QoE objectives. These relatively conservative control strategies cannot automatically adapt to changes in the QoE model, resulting in lower QoE gains. Furthermore, unlike the proposed method, without the submodules for predicting the viewpoint traces and the bandwidth conditions, it is difficult for the 360-P method to appropriately optimize the bitrate selection for segments or tiles. Furthermore, in EPASS, the limited usage of the historical traces and video contents for viewpoint prediction leads to lower QoE gains compared with the proposed method, which overcomes these limitations by employing RL and game theory and considering both temporal viewpoint variations and spatial video content variations.

Performance Evaluation on Synthetic Bandwidth Datasets

The performance evaluation conducted on synthetic bandwidth datasets is also presented. The detailed QoE metrics under the different cases of synthetic mobile network profiles are presented in the tables of FIGS. 14 to 17. It can be seen from these tables that the proposed algorithm outperforms the other algorithms, maintaining higher viewing quality, lower quality fluctuations, and lower playback freezing lengths, because of its ability to adaptively meet the QoE objectives most of the time. In Case 1, as shown in FIG. 14, the LR/LR-G and 360-P methods exhibit greater quality fluctuations. The table shown in FIG. 15 shows that in Case 2, the LR/LR-G method yields results close to those of the proposed method and the EPASS method. Both the proposed and LR/LR-G methods select the lowest bitrate quality for most of the playback time. However, the 360-P method leads to a longer stalling event than the other methods, effectively decreasing the user QoE. The average bitrates achieved with the compared methods behave similarly under the influence of a low and fluctuating cellular network bandwidth. As shown in the table in FIG. 16, because of the high short-term fluctuations in the bandwidth profile in Case 3, the EPASS and 360-P methods select almost the same average bitrate as the proposed method. However, the proposed method still achieves the highest video quality among the compared methods, with a shorter playback freezing length and less quality fluctuation, with the help of its more precise viewpoint prediction. The LR/LR-G method shows poor behavior, allocating too much bitrate to unviewed tiles. In addition, the 360-P method results in the most quality switches as a result of the instantaneous bandwidth prediction mechanism. A comparison of the results in the table of FIG. 14 reveals that the proposed method also enables suitable performance in this special case, providing a high viewing quality with low quality fluctuations. The 360-P method suffers from longer stalling events, as shown in the table in FIG. 17. An average bitrate close to that of the proposed method may be achieved with the EPASS or 360-P method; however, the viewing quality is lower more often than with the proposed method, and more viewing quality fluctuations are present. It can also be seen from this experiment that the proposed method is superior to the method presented in Y. Zhang et al "Epass360: QoE-aware 360-degree video streaming over mobile devices," IEEE Transactions on Mobile Computing, pp. 1-1, 2020. The results show that the method of the above embodiment can achieve better results in terms of various QoE metrics. Specifically, the method of the above embodiment has improved performance, which stems from its joint employment of RL and game theory for ABR control and viewpoint prediction considering both the temporal viewpoint traces and spatial video content variations. Thus, the proposed method is well suited for viewpoint prediction and ABR control for 360-degree video streaming over mobile devices in wireless environments.

Ablation Study on Real Bandwidth Datasets

Figure 18:
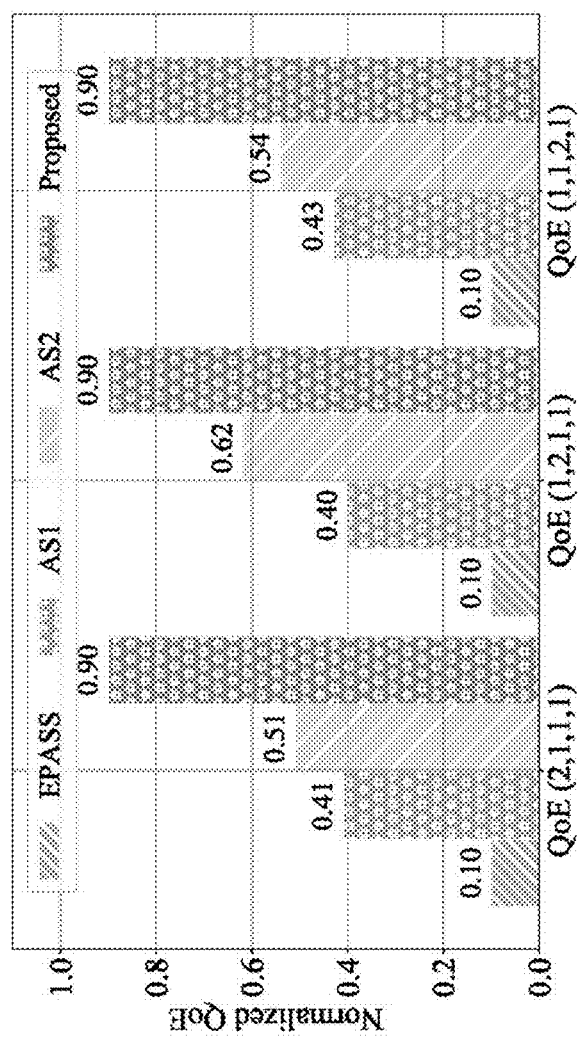
FIG. 18 is a graph showing comparison of quality of experience (QoE) in terms of different QoE objectives for different viewpoint prediction methods (including the method in one embodiment of the invention and existing methods) in an ablation study.

The results of an ablation study for which the normalized QoE (minimum is set to 0.1, and maximum is set to 0.9) results under different QoE objectives are shown in FIG. 18. It can be seen from this figure that the proposed algorithm outperforms the other algorithm variants because of its ability to adaptively meet the QoE objectives most of the time. Among the tested variants, the designed method AS1 is based on the proposed method. The difference is that the EPASS tile allocation method is used when allocating the bitrate for each tile in a segment. The designed method AS2 is also based on the proposed method, but its bandwidth prediction and viewpoint prediction methods are based on those of EPASS. It can be seen from the results in FIG. 12 that AS1's QoE gain is slightly better than that of EPASS, whereas the QoE gain of AS2 is the second best. The reason is that the ultimate goal in the cooperative game is to maximize the resource allocation for each user in the game to systematically achieve the optimal outcome. If there is no such systematic allocation step, a better prediction result still cannot enable effective bandwidth allocation to the tiles in accordance with the user's needs, resulting in a waste of bandwidth resources and QoE degradation. Thus, to achieve proficient viewpoint prediction and ABR control for 360-degree video streaming over mobile devices in wireless environments, it is necessary to jointly employ RL and game theory for ABR control and viewpoint prediction considering both temporal viewpoint traces and spatial video content variations.

Remarks

Existing bitrate adaptation algorithms have difficulty providing smooth and steady video quality for 360-degree streaming users on mobile devices under highly dynamic network conditions because the viewpoint prediction and bitrate adaptation methods are based on instantaneous states rather than full consideration of historical data. To guarantee a high QoE in terms of different objectives to ensure both smoothness and steadiness, a hybrid control scheme is proposed in the above embodiment for a dynamic adaptive 360-degree streaming system, which can efficiently make viewpoint prediction and ABR decisions under various network and user behavior conditions to optimize various QoE objectives for the user. The proposed method leverages RL for continuous segment-level bitrate control and game theory for tile-level bitrate allocation while fully considering both temporal viewpoint variations and spatial video content variations. Experimental evaluations of the proposed scheme show that the proposed tile-based 360-degree streaming system can achieve improved QoE gains in diverse scenarios on mobile devices.

Exemplary Hardware

Figure 19:
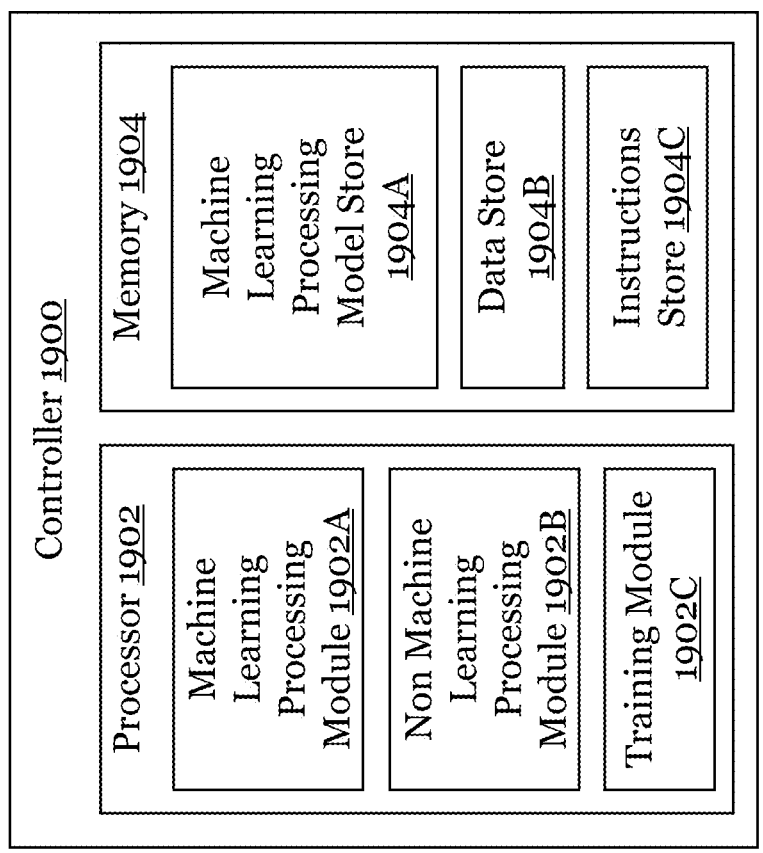
FIG. 19 is a functional block diagram of a controller in one embodiment of the invention.

FIG. 19 shows a controller 1900 in one embodiment of the invention. The controller 1900 can be used to perform the video streaming method in the present invention, including but not limited to the above embodiment.

The controller 1900 includes a processor 1902 and a memory 1904. The processor 1902 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process information and/or data. The memory 1904 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations.

The processor 1902 includes a machine learning processing module 1902A and a non machine learning processing module 1902B. The machine learning processing module 1902A is arranged to process data using one or more machine learning processing models (e.g., reinforcement learning model such as DDPG model, recurrent neural network model such as LSTM model). The non machine learning processing module 1902B is arranged to process data without using machine learning processing models or methods. For example, the non machine learning processing module 1902B may be used to perform various data processing such as filtering, segmenting, thresholding, averaging, smoothing, padding, transforming, scaling, etc. The processor 1902 also includes a training module 1902C arranged to train the machine learning processing model(s), such as the model(s) in the memory 1904.

The memory 1904 includes a machine learning processing model store 1904A arranged to store one or more machine learning processing models to be used by the processor 1902 for processing data. The one or more machine learning processing models may include the reinforcement learning model such as the DDPG model and the recurrent neural network model(s) such as LSTM model(s) for HM and EF predictions. In one example, only one machine learning processing model is stored. In another example, multiple machine learning processing models are stored. The machine learning processing model(s) in the machine learning processing model store 1904A may be trained, re-trained, or updated as needed—new or modified machine learning processing model(s) may be obtained by training or by data transfer (loading into the controller 1900). The memory 1904 also includes data store 1904B and instructions store 1904C. The data store 1904B may store: training/validation/test data for training/validating/testing the machine learning processing model(s), data received from external devices such as a streaming server, etc. The training/validation/test data used to train/validate/test the respective machine learning processing model(s) may be classified for use in the training/validating/testing different machine learning processing models. The instructions store 1904C stores instructions, commands, codes, etc., that can be used by the processor 1902 to operate the controller 1900.

Figure 20:
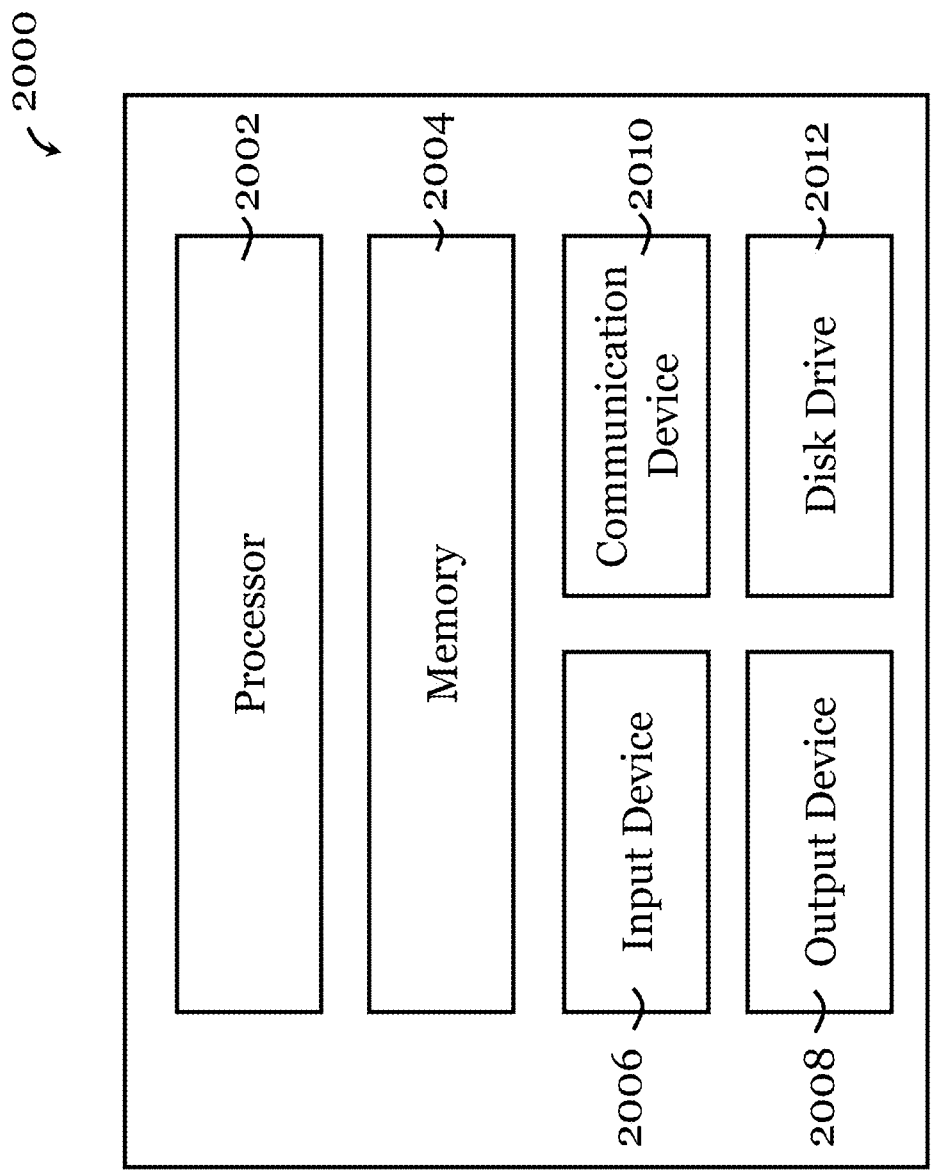
FIG. 20 is a functional block diagram of an information handling system in one embodiment of the invention.

FIG. 20 shows an exemplary information handling system 2000 that can be used as a server (or part of it), a mobile device (or part of it), or another type of information processing system in one embodiment of the invention. The information handling system 2000 generally comprises suitable components necessary to receive, store, and execute appropriate computer instructions, commands, or codes. The main components of the information handling system 2000 are a processor 2002 and a memory (storage) 2004. The processor 2002 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 2004 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 2004. Optionally, the information handling system 2000 further includes one or more input devices 2006. Examples of such input device 2006 include one or more of: keyboard, mouse, stylus, image scanner (e.g., identifier (barcode, QR code, etc.) scanner), microphone, tactile/touch input device (e.g., touch sensitive screen), image/video input device (e.g., camera), biometric data input device (e.g., fingerprint detector, facial detector, etc.), motion detector (e.g., head motion and eye movement detectors) for determining playback state, etc. Optionally, the information handling system 2000 further includes one or more output devices 2008. Examples of such output device 2008 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The information handling system 2000 may further include one or more disk drives 2012 which may encompass one or more of: solid state drive, hard disk drive, optical drive, flash drive, magnetic tape drive, etc. A suitable operating system may be installed in the information handling system 2000, e.g., on the disk drive 2012 or in the memory 2004. The memory 2004 and the disk drive 2012 may be operated by the processor 2002. Optionally, the information handling system 2000 also includes a communication device 2010 for establishing one or more communication links (not shown) with one or more other computing devices such as servers, personal computers, terminals, tablets, phones, watches, IoT devices, or other wireless or handheld computing devices. The communication device 2010 may include one or more of: a modem, a Network Interface Card (NIC), an integrated network interface, a NFC transceiver, a ZigBee transceiver, a cellular network transceiver, Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 2002, the memory 2004, and optionally the input device(s) 2006, the output device(s) 2008, the communication device 2010 and the disk drives 2012 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 2000 shown in FIG. 20 is merely exemplary and that the information handling system 2000 can in other embodiments have different configurations (e.g., additional components, fewer components, etc.)

General Video Streaming Method

Figure 21:
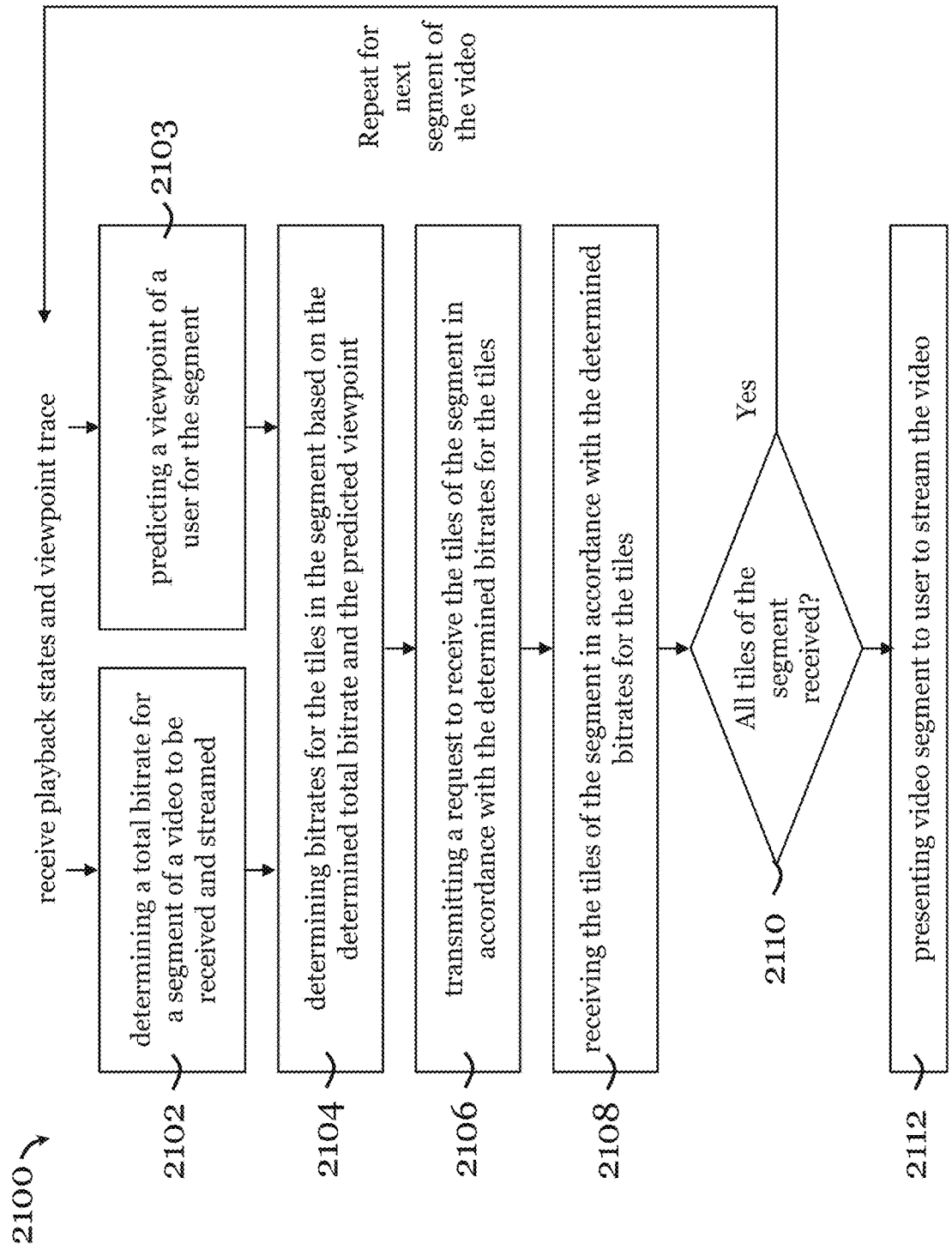
FIG. 21 is a flowchart illustrating a video streaming method in one embodiment of the invention.

FIG. 21 illustrates a video streaming method 2100 in one embodiment of the invention. The above presented video streaming method is one embodiment of this method 2100.

As shown in FIG. 21, the method begins with steps 2102 and 2103, in which a total bitrate for a video segment to be received (and streamed) is determined/predicted and a viewpoint of the user for that video segment is determined/predicted. Steps 2102 and 2103 can be performed one after another, or substantially simultaneously, depending on the implemented embodiment. Preferably, at least one, preferably both, steps 2102 and 2103 are performed after all tiles in a previous segment of the video have been received or downloaded.

In step 2102, the total bitrate is determined/predicted based at least in part on the received playback states (e.g., associated with a previous video segment consecutive with the video segment). The determination may be based on adaptive optimization of a quality of experience function. The adaptive optimization of the quality of experience function may be based on a deep reinforcement learning model, such as a deep deterministic policy gradient algorithm, including but not limited to the one presented in the above embodiment.

In step 2103, the viewpoint of the user is determined/predicted based at least in part on the received viewpoint trace (e.g., associated with a previous video segment consecutive with the video segment, or a current viewpoint of the user). The determination/prediction of the viewpoint of the user may be based on the method presented in the above embodiment. The viewpoint trace of the user may comprise, at least, a head movement trace and an eye fixation trace. Step 2103 may include predicting a single-user viewpoint trace for the segment based on a received viewpoint trace of the user (e.g., associated with the previous segment(s) of the video), and optionally, also predicting a cross-user viewpoint trace for the segment. Step 2103 may include predicting head movement area (e.g., map) of the user for the segment and predicting eye fixation area (e.g., map) of the user for the segment. The prediction may be performed using a recurrent neural network model (e.g., a long short term memory model) processing the received viewpoint trace of the user. The prediction of the cross-user viewpoint trace for the segment may be performed based on a saliency map (SM) of known cross-user viewpoint traces associated with the segment.

After steps 2102 and 2103, in step 2104, the method 2100 determines bitrates for the tiles (preferably all of the tiles) in the segment based on the determined total bitrate and the predicted viewpoint. The determination may include allocating bitrate to each of the tiles such that a sum of the bitrates of all tiles in the segment in substantially equal to the determined total bitrate. In one example, step 2104 includes allocating a lower bitrate (or bitrates) to the tiles in area outside a predicted head movement area for the segment and allocating a higher bitrate (or bitrates) to the tiles in area inside a predicted head movement area for the segment. The bitrate(s) of the tiles in area outside the predicted head movement area need not be identical. Likewise, the bitrate(s) of the tiles in area inside the predicted head movement area need not be identical. In one implementation, a minimum available bitrate is allocated to the tiles in area outside a predicted head movement area for the segment. In one implementation, the tiles in area inside the predicted head movement area but outside the predicted eye fixation area for the segment is allocated lower bitrate (or bitrates) compared with the tiles in area inside both the predicted head movement area and the predicted eye fixation area for the segment. In one implementation, bitrates between adjacent tiles of the segment to be within a difference threshold to avoid apparent presence of boundary.

Once the bitrates for the tiles of the segment are determined, then in step 2106, a request to receive the tiles of the segment in accordance with the determined bitrates for the tiles is generated and transmitted, e.g., from the one or more controllers to a streaming server. In a preferred embodiment, the request includes an order indicator to receive the tiles of the segment with the largest determined bitrate first or in the order of decreasing bitrates. This ensures that the tiles with highest bitrate are received earlier than the other tiles.

In step 2108, the tiles of the segment are received, e.g., from a streaming server operably connected with the one or more controllers, in accordance with the determined bitrates for the tiles.

In step 2110, a determination is made, e.g. by the one or more controllers, as to whether all tiles of that segment is received. If yes, the method 2100 returns to receiving updated playback states and viewpoint trace, or to steps 2102 and 2103, for the next video segment to be received (or downloaded). If not, the method 2100 will wait unit all tiles of that segment is received before returning to receiving updated playback states and viewpoint trace, or to steps 2102 and 2103, for the next video segment to be received (or downloaded).

In step 2112, which may be performed after step 2108 irrespective of the progress of step 2110, the received tiles are processed and the corresponding video content is streamed to the user (e.g., provided to the user at a display operably connected with the one or more controllers).

The steps in method 2100 may be performed by one or more controllers, e.g., at the electrical device for streaming and playing the video, in which case the viewpoint trace and the playback states may be received locally from detectors operably connected with the one or more controllers. The method 2100 can be repeated for two or more or all segments of the video so as to stream the video. The method 2100 is preferably applied for streaming 360 degrees video. However, it is contemplated that the method 2100 can be used to stream other video.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Various optional features of the invention are set out in the summary. For example, the steaming method and/or system may be applied to steam video other than 360 degrees video. The steaming method and/or system may be applied to stream only part of an entire video. The specific algorithms, models, etc., may be adjusted or modified to take into account additional or alternative factors for streaming the video. The video source file may be encoded or processed in a different format. The steaming method and/or system may be applied to other electrical device (not limited to mobile device).

The invention claimed is:

1. A method for streaming a video, comprising:
 (a) determining, based on adaptive optimization of a quality of experience function, a total bitrate for a segment of the video to be received and streamed, the adaptive optimization of the quality of experience function being based on a deep deterministic policy gradient algorithm;
 (b) predicting a viewpoint of a user for the segment; and
 (c) determining bitrates for one or more tiles of a plurality of tiles in the segment based on the determined total bitrate and the predicted viewpoint.

2. The method of claim 1, wherein step (a) and/or step (b) is performed after all tiles in a previous segment of the video have been received.

3. The method of claim 1, wherein the deep deterministic policy gradient algorithm is arranged to process playback states of the user to determine the total bitrate of the segment with an objective to optimize or maximize the quality of experience function.

4. The method of claim 3, wherein the playback states include:
 past K bitrate records,
 corresponding download time,
 predetermined tile bitrate set for the segment,
 current buffer length, and
 current freezing length,
 wherein K is a number larger than 0.

5. The method of claim 3, wherein the quality of experience function includes the following factors:
 factor associated with visual quality of viewed tiles in the previous segment,
 factor associated with average quality variation between two segments,
 playback freezing event factor, and
 future freezing risk factor.

6. The method of claim 5, wherein one or more of the factors of the quality of experience function is weighted by a respective weighting factor.

7. The method of claim 6, wherein the respective weighting factor is adjustable based on a user input and/or a content of the segment or the video.

8. The method of claim 1, wherein step (b) includes predicting a single-user viewpoint trace for the segment based on a received viewpoint trace of the user.

9. The method of claim 8, wherein the received viewpoint trace of the user comprises a head movement trace and an eye fixation trace.

10. The method of claim 9, wherein step (b) includes predicting a head movement area of the user for the segment and predicting an eye fixation area of the user for the segment.

11. The method of claim 10, wherein the prediction of the single-user viewpoint trace for the segment is performed by processing the received viewpoint trace of the user using a long short term memory model.

12. The method of claim 10, wherein step (c) comprises determining bitrates for all of the tiles in the segment.

13. The method of claim 12, wherein determining the bitrates for all of the tiles in the segment comprises allocating bitrate to each of the tiles such that a sum of the bitrates of all of the tiles in the segment in substantially equal to the total bitrate.

14. The method of claim 13, the determining comprises:
 allocating a lower bitrate to the tiles in an area outside the predicted head movement area for the segment; and
 allocating higher bitrate to the tiles in an area inside the predicted head movement area for the segment.

15. The method of claim 14, wherein allocating lower bitrate to the tiles in the area outside the predicted head movement area for the segment comprises:
 allocating minimum bitrate to the tiles in the area outside the predicted head movement area for the segment.

16. The method of claim 14, wherein allocating higher bitrate to the area inside the predicted head movement area for the segment, comprises:
 allocating lower bitrate to the tiles in an area outside the predicted eye fixation area for the segment;
 and allocating higher bitrate to the tiles in an area inside the predicted eye fixation area for the segment.

17. The method of claim 14, wherein the determining comprises: controlling bitrates between adjacent tiles of the segment to be within a difference threshold.

18. The method of claim 8, wherein step (b) further includes predicting a cross-user viewpoint trace for the segment.

19. The method of claim 18, wherein the prediction of the cross-user viewpoint trace for the segment is performed based on a saliency map of known cross-user viewpoint traces associated with the segment.

20. The method of claim 19, wherein the predicted single-user viewpoint trace for the segment and the predicted cross-user viewpoint trace for the segment are both applied to predict the viewpoint of the user for the segment.

21. The method of claim 20, wherein the predicted single-user viewpoint trace for the segment is weighted with a first weighting factor and the predicted cross-user viewpoint trace for the segment is weighted with a second weighting factor.

22. The method of claim 1, further comprising:
 transmitting a request to receive the tiles of the segment in accordance with the determined bitrates for the tiles.

23. The method of claim 22, wherein the request includes an order indicator to receive the tiles of the segment in the order of decreasing bitrates.

24. The method of claim 1, further comprising repeating steps (a) to (c) for two or more segments of the video so as to stream at least part of the video.

25. The method of claim 1, wherein the video is a 360-degree video.

26. A system streaming a video, comprising:
 one or more controllers arranged to:
 determine, based on adaptive optimization of a quality gf experience function, a total bitrate for a segment of the video to be received and streamed, the adaptive optimization of the quality of experience function being based on a deep deterministic policy gradient algorithm;
 predict a viewpoint of a user for the segment; and
 determine bitrates for one or more tiles of a plurality of tiles in the segment based on the determined total bitrate and the predicted viewpoint.

27. The system of claim 26, further comprising a display operably connected with the one or more controllers for presenting the received segment or the video to the user.

28. The system of claim 26, wherein the one or more controllers is arranged an electrical device operably connected with a streaming server via a communication network.

29. The system of claim 28, wherein the electrical device comprises a head mounted display device.

30. The system of claim 28, wherein the streaming server comprises a Dynamic Adaptive Streaming over HTTP (DASH) server.

31. The system of claim 26, wherein the video is a 360-degree video.

32. The system of claim 26, wherein the one or more controllers are arranged to process playback states of the user using the deep deterministic policy gradient algorithm to determine the total bitrate of the segment with an objective to optimize or maximize the quality of experience function.

33. The system of claim 32, wherein the playback states include:
past K bitrate records,
corresponding download time,
predetermined tile bitrate set for the segment,
current buffer length, and
current freezing length,
wherein K is a number larger than 0.

34. The system of claim 32, wherein the quality of experience function includes the following factors:
factor associated with visual quality of viewed tiles in a previous segment,
factor associated with average quality variation between two segments,
playback freezing event factor, and
future freezing risk factor.

35. The system of claim 34, wherein one or more of the factors of the quality of experience function is weighted by a respective weighting factor.

36. The system of claim 26, wherein the one or more controllers are arranged to process a received viewpoint trace of the user using a long short term memory model to predict a single-user viewpoint trace for the segment.

37. The system of claim 26, wherein the one or more controllers are arranged to:
predict a single-user viewpoint trace for the segment based on a received viewpoint trace of the user;
and predict a cross-user viewpoint trace for the segment based on a saliency map of known cross-user viewpoint traces associated with the segment.

38. The system of claim 37, wherein the one or more controllers are arranged to apply both the predicted single-user viewpoint trace for the segment and the predicted cross-user viewpoint trace for the segment to predict the viewpoint of the user for the segment.

39. The system of claim 38, wherein the predicted single-user viewpoint trace for the segment is weighted with a first weighting factor and the predicted cross-user viewpoint trace for the segment is weighted with a second weighting factor.

40. The system of claim 26, wherein the one or more controllers are arranged to:
predict a single-user viewpoint trace for the segment based on a received viewpoint trace of the user,
the received viewpoint trace of the user comprises a head movement trace and an eye fixation trace;
predict a head movement area of the user for the segment;
predict an eye fixation area of the user for the segment; and
determine bitrates for all of the tiles in the segment.

41. The system of claim 40, wherein the one or more controllers are arranged to allocate bitrate to each of the tiles such that a sum of the bitrates of all of the tiles in the segment in substantially equal to the total bitrate.

42. The system of claim 41, wherein the one or more controllers are arranged to:
allocate lower bitrate to the tiles in an area outside the predicted head movement area for the segment; and
allocate higher bitrate to the tiles in an area inside the predicted head movement area for the segment.

43. The system of claim 42, wherein the one or more controllers are arranged to:
allocate minimum bitrate to the tiles in the area outside the predicted head movement area for the segment.

44. The system of claim 42, wherein the one or more controllers are arranged to:
allocate lower bitrate to the tiles in an area outside the predicted eye fixation area for the segment; and
allocate higher bitrate to the tiles in an area inside the predicted eye fixation area for the segment.

45. The system of claim 42, wherein the one or more controllers are arranged to control bitrates between adjacent tiles of the segment to be within a difference threshold.

46. A method for streaming a video, comprising:
(a) determining a total bitrate for a segment of the video to be received and streamed;
(b) predicting a viewpoint of a user for the segment; and
(c) determining bitrates for one or more tiles in the segment based on the determined total bitrate and the predicted viewpoint;
wherein step (b) includes:
predicting a single-user viewpoint trace for the segment based on a received viewpoint trace of the user, the received viewpoint trace of the user comprises a head movement trace and an eye fixation trace; and
predicting head movement area of the user for the segment and predicting eye fixation area of the user for the segment;
wherein the prediction of the single-user viewpoint trace for the segment is performed by processing the received viewpoint trace of the user using a long short term memory model.

47. A method for streaming a video, comprising:
(a) determining a total bitrate for a segment of the video to be received and streamed;
(b) predicting a viewpoint of a user for the segment; and
(c) determining bitrates for one or more tiles in the segment based on the determined total bitrate and the predicted viewpoint;
wherein step (b) includes:
predicting a single-user viewpoint trace for the segment based on a received viewpoint trace of the user, and
predicting a cross-user viewpoint trace for the segment based on a saliency map of known cross-user viewpoint traces associated with the segment.

48. The method of claim 47, wherein the predicted single-user viewpoint trace for the segment and the predicted cross-user viewpoint trace for the segment are both applied to predict the viewpoint of the user for the segment.

49. A method for streaming a video, comprising:
(a) determining a total bitrate for a segment of the video to be received and streamed;
(b) predicting a viewpoint of a user for the segment; and (c) determining bitrates for one or more tiles of a plurality of tiles in the segment based on the determined total bitrate and the predicted viewpoint;

wherein step (b) includes:

predicting a single-user viewpoint trace for the segment based on a received viewpoint trace of the user, the received viewpoint trace of the user comprises a head movement trace and an eye fixation trace; and predicting head movement area of the user for the segment and predicting eye fixation area of the user for the segment; and wherein step (c) comprises determining bitrates for all of the tiles in the segment.

50. The method of claim 49, wherein determining bitrates for all of the tiles in the segment comprises allocating bitrate to each of the tiles such that a sum of the bitrates of all of the tiles in the segment in substantially equal to the total bitrate.

51. The method of claim 49, the determining comprises:

allocating lower bitrate to the tiles in an area outside the predicted head movement area for the segment; and allocating higher bitrate to the tiles in an area inside the predicted head movement area for the segment.

\* \* \* \* \*